US010303973B2

(12) United States Patent
Nakada et al.

(10) Patent No.: US 10,303,973 B2

(45) Date of Patent: May 28, 2019

(54) IMAGE PROCESSING APPARATUS, IMAGE PROCESSING METHOD, AND STORAGE MEDIUM FOR LIGHTING PROCESSING ON IMAGE USING MODEL DATA

(71) Applicant: CANON KABUSHIKI KAISHA, Tokyo (JP)

(72) Inventors: Yuichi Nakada, Yokohama (JP); Shugo Higuchi, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 278 days.

(21) Appl. No.: 15/093,585

(22) Filed: Apr. 7, 2016

(65) Prior Publication Data

US 2016/0307324 A1 Oct. 20, 2016

(30) Foreign Application Priority Data

Apr. 15, 2015 (JP) ................................ 2015-083724
May 20, 2015 (JP) ................................ 2015-102819

(51) Int. Cl.

| | |
|---|---|
| ***G06K 9/62*** | (2006.01) |
| ***G06T 5/00*** | (2006.01) |
| ***G06T 5/50*** | (2006.01) |

(52) U.S. Cl.

CPC ............ *G06K 9/6215* (2013.01); *G06T 5/005* (2013.01); *G06T 5/008* (2013.01); *G06T 5/50* (2013.01); *G06T 2200/04* (2013.01); *G06T 2207/10024* (2013.01); *G06T 2207/10028* (2013.01); *G06T 2207/20012* (2013.01); *G06T 2207/30201* (2013.01)

(58) Field of Classification Search

CPC ................................................ G06K 9/6215
USPC ..................................................... 348/135
See application file for complete search history.

(56) References Cited

U.S. PATENT DOCUMENTS

2009/0059030 A1* 3/2009 Hoshii .................. H04N 5/232 348/222.1
2010/0201848 A1* 8/2010 Fukui ................ H04N 5/23219 348/234
2016/0224853 A1* 8/2016 Xiong .................... G06F 21/32

FOREIGN PATENT DOCUMENTS

| | | | |
|---|---|---|---|
| JP | 2009-128969 | A | 6/2009 |
| JP | 2011-091523 | A | 5/2011 |
| JP | 5088220 | B2 | 12/2012 |
| JP | 5147287 | B2 | 2/2013 |

* cited by examiner

*Primary Examiner* — Yulin Sun

(74) *Attorney, Agent, or Firm* — Canon USA, Inc., IP Division

(57) ABSTRACT

An image processing apparatus generates a normal image, when lighting correction of an image is performed using three-dimensional shape data. Three-dimensional shape data of a predetermined object is adjusted with a subject in position, based on a feature pattern detected in image data, and lighting processing for correcting a pixel value of the image data is performed based on the adjusted three-dimensional shape data, distance information of the subject, and a position of a virtual light source. When the three-dimensional shape data is adjusted with the image data in position, a region having a large irregularity in the three-dimensional shape data is preferentially adjusted in position.

14 Claims, 36 Drawing Sheets

CAPTURED IMAGE DATA I(i, j)

RANGE IMAGE DATA P(i, j)

NORMAL IMAGE DATA N(i, j)

☐ FACE REGION 6010

● P0 SUBJECT POSITION

- CALCULATE DISTANCE VALUE OF FACE REGION FROM DISTANCE VALUE INCLUDED IN FACE REGION
- EXTRACT SUBJECT CANDIDATE REGION BASED ON DISTANCE VALUE OF FACE REGION

- SMALL COMPONENT REMOVAL PROCESSING
- FILLING PROCESSING

- PERFORM SMOOTHING BASED ON COLOR DIFFERENCE IN PIXEL VALUE BY REFERRING TO CAPTURED IMAGE

IMAGE PROCESSING APPARATUS, IMAGE PROCESSING METHOD, AND STORAGE MEDIUM FOR LIGHTING PROCESSING ON IMAGE USING MODEL DATA

BACKGROUND OF THE INVENTION

Field of the Invention

One disclosed aspect of the embodiments relates to a technique for adding shade to image data.

Description of the Related Art

When an image of a subject is captured using an imaging apparatus or device, illumination conditions, such as a light amount and a direction of light for the subject, greatly influence the appearance of the captured image. For example, when light is obliquely incident upon a subject, a three-dimensional effect of the subject is emphasized. When light is incident upon a subject from the rear, the front of the subject is in shadow and therefore, an image gives a dim and flat impression. As a method for adjusting the appearance of such an image, Japanese Patent No. 5088220 discusses a method for generating an image under virtual illumination conditions by using three-dimensional shape data corresponding to the subject. More specifically, in the technique discussed in Japanese Patent No. 5088220, an image under virtual illumination conditions is rendered using three-dimensional shape data, and then this image is placed in a region where a subject is present in a captured image, so that an image under different illumination conditions is generated. As another method, Japanese Patent No. 5147287 discusses a method for estimating a normal direction of a surface of a subject from a captured image, and generating an image under virtual illumination conditions based on the estimated normal direction. More specifically, in the technique discussed in Japanese Patent No. 5147287, the normal direction is estimated from brightness information of the captured image, and an image, in which lighting is corrected based on the normal direction, is generated.

However, the technique discussed in Japanese Patent No. 5088220 has the following problem. In this technique, the image rendered from the three-dimensional shape data is a computer graphics (CG) image, and this CG image and the captured image are synthesized. Therefore, if position adjustment between the CG image and the captured image is poor, a strange image is obtained. The technique discussed in Japanese Patent No. 5147287 also has a problem. In this technique, the normal direction is estimated based on the brightness of the captured image and therefore, the correct normal direction cannot be estimated if noise and shadow are included in the subject image.

SUMMARY OF THE INVENTION

One disclosed aspect of the embodiments is directed to an image processing apparatus capable of generating a normal image, when lighting correction of an image is performed using three-dimensional shape data.

According to an aspect of the embodiments, an image processing apparatus includes an image acquisition unit, a distance acquisition unit, a setting unit, a detection unit, a holding unit, a position adjustment unit, a position adjustment unit, and a processing unit. The image acquisition unit is configured to acquire image data including a subject. The distance acquisition unit is configured to acquire distance information, which indicates a distance from an imaging device that has captured the image data to the subject, for each pixel of the image data. The setting unit is configured to set a position of a light source, in a scene indicated by the image data. The detection unit is configured to detect, in the image data, a predetermined feature pattern of the subject, and to detect a position of each of a plurality of reference points to be used for position adjustment of data, based on the feature pattern. The holding unit is configured to hold model data indicating a three-dimensional shape of a predetermined object having the predetermined feature pattern, and to hold information indicating a position of each of the plurality of reference points in the model data. The position adjustment unit is configured to perform position adjustment of the model data with the subject, based on the position of each of the plurality of reference points included in the model data, and the position of each of the plurality of reference points detected by the detection unit. The processing unit is configured to perform lighting processing for correcting a pixel value of the image data, based on the model data for which the position adjustment has been performed by the position adjustment unit, the distance information, and the position of the light source, wherein, in the position adjustment, the position adjustment unit places greater importance on a degree of agreement in terms of a first reference point among the plurality of reference points, than on a degree of agreement in terms of a second reference point different from the first reference point.

Further features of the disclosure will become apparent from the following description of exemplary embodiments with reference to the attached drawings.

DESCRIPTION OF THE EMBODIMENTS

Figure 1A:
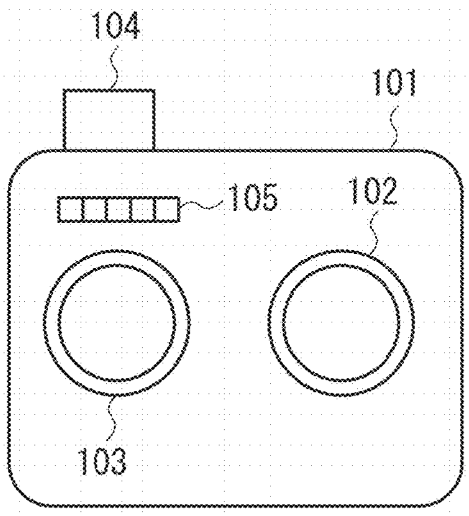
FIGS. 1A and 1B are diagrams illustrating a housing of an imaging apparatus or device according to a first exemplary embodiment.

Exemplary embodiments of the disclosure will be described below with reference to the drawings. The following exemplary embodiments are not intended to limit the disclosure. In addition, not all combinations of features described in the exemplary embodiments are necessary for the disclosure. Similar configurations are provided with the same reference numerals, when described.

Figure 1B:
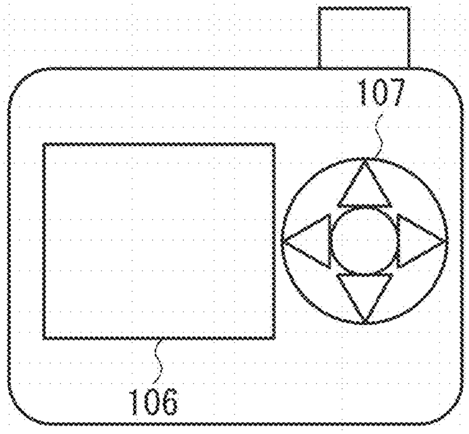

FIGS. 1A and 1B are diagrams illustrating a housing of an imaging apparatus or device 101 according to a first exemplary embodiment. FIG. 1A illustrates a front face of the imaging apparatus 101, and FIG. 1B illustrates a back face of the imaging apparatus 101. The housing of the imaging apparatus 101 includes two imaging units 102 and 103, an imaging button 104, a light emitting unit 105, a display unit 106, and an operation unit 107. The imaging units 102 and 103 are each configured of an imaging optical system including components such as a zoom lens, a focus lens, a shake correction lens, an iris, a shutter, an optical filter, a sensor, an analog-to-digital (A/D) conversion unit. The imaging units 102 and 103 each receive light information of a subject with the sensor. The sensor is configured of an imaging sensor such as a complementary metal oxide semiconductor (CMOS) sensor and a charge coupled device (CCD) sensor. The light information received by the sensor is converted into digital data by the A/D conversion unit. The imaging button 104 is provided for a user to instruct the imaging apparatus 101 to start image capturing. The light emitting unit 105 is an illuminator capable of emitting light when image capturing starts according to an instruction of the user. The display unit 106 is a display for displaying, for example, image data processed by the imaging apparatus 101 and a setting menu. For example, a liquid crystal display can be used for the display unit 106. The operation unit 107 is a button provided for the user to specify a changeable parameter in the imaging apparatus 101. The display unit 106 may have a touch screen function, and in such a case, a user instruction provided using the touch screen can be treated as an input to the operation unit 107.

Figure 2:
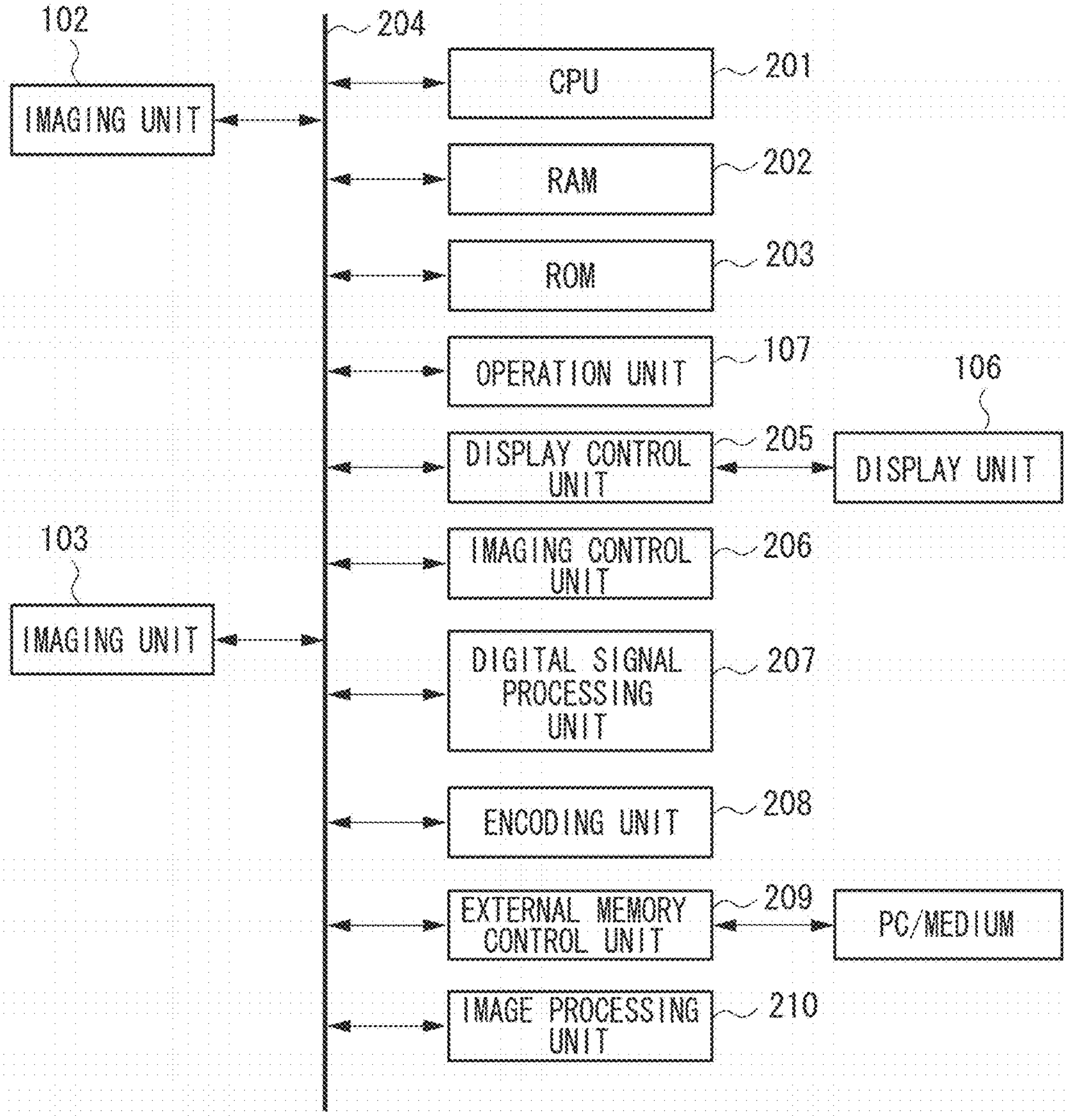
FIG. 2 is a block diagram illustrating an internal configuration of the imaging apparatus or device according to the first exemplary embodiment.

FIG. 2 is a block diagram illustrating an internal configuration of the imaging apparatus 101. A central processing unit (CPU) 201 is a processing circuit that comprehensively controls each part to be described below. A random access memory (RAM) 202 serves as a main memory and a work area for the CPU 201. A read only memory (ROM) 203 stores a control program to be executed by the CPU 201. A bus 204 is a transfer path for various kinds of data. For example, digital data acquired by each of the imaging units 102 and 103 is sent to a predetermined processing unit via the bus 204. A display control unit 205 is a control circuit that performs display control for image data and characters to be displayed on the display unit 106. An imaging control unit 206 is a drive circuit that performs control, such as focusing, opening/closing of the shutter, and adjustment of an aperture, for each of the imaging units 102 and 103, based on an instruction from the CPU 201. A digital signal processing unit 207 is a processing circuit that performs various kinds of processing, such as white balance processing, gamma processing, and noise reduction processing, on digital data received via the bus 204. An encoding unit 208 is a processing circuit that converts digital data into a file format such as Joint Photographic Experts Group (JPEG) and Motion Picture Experts Group (MPEG). An external memory control unit 209 is an interface for connecting the imaging apparatus 101 to a personal computer (PC) and a medium (e.g., a hard disk, a memory card, a CompactFlash (CF) card, a Secure Digital (SD) card, a Universal Serial Bus (USB) memory). An image processing unit 210 is a processing circuit that performs image processing such as lighting correction, by using digital data acquired by the imaging units 102 and 103, or digital data output from the digital signal processing unit 207. The image processing unit 210 will be described in detail below. Components other than those described above included in the imaging apparatus 101 are not the main point of the present exemplary embodiment and therefore will not be described.

<Image Processing Unit>

Figure 3:
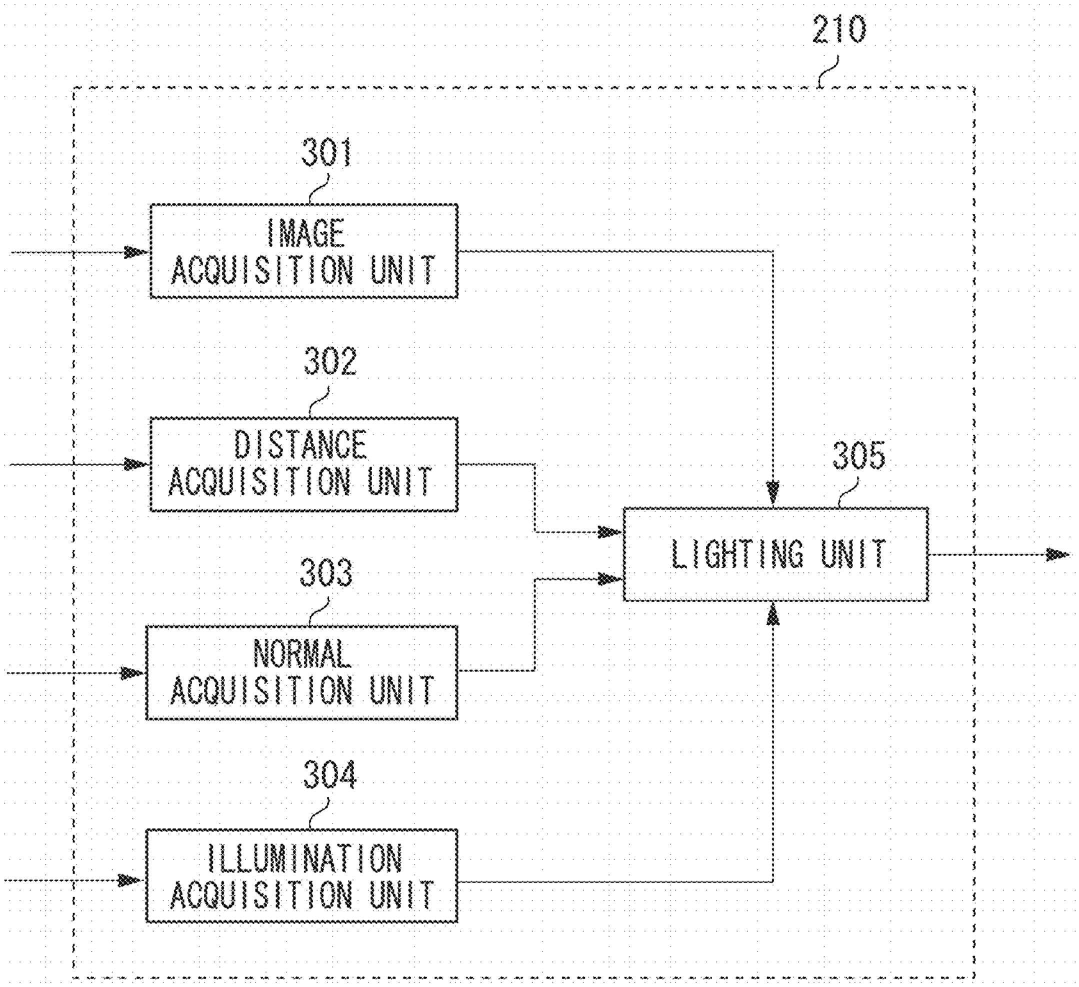
FIG. 3 is a block diagram illustrating a configuration of an image processing unit according to the first exemplary embodiment.
Figure 4:
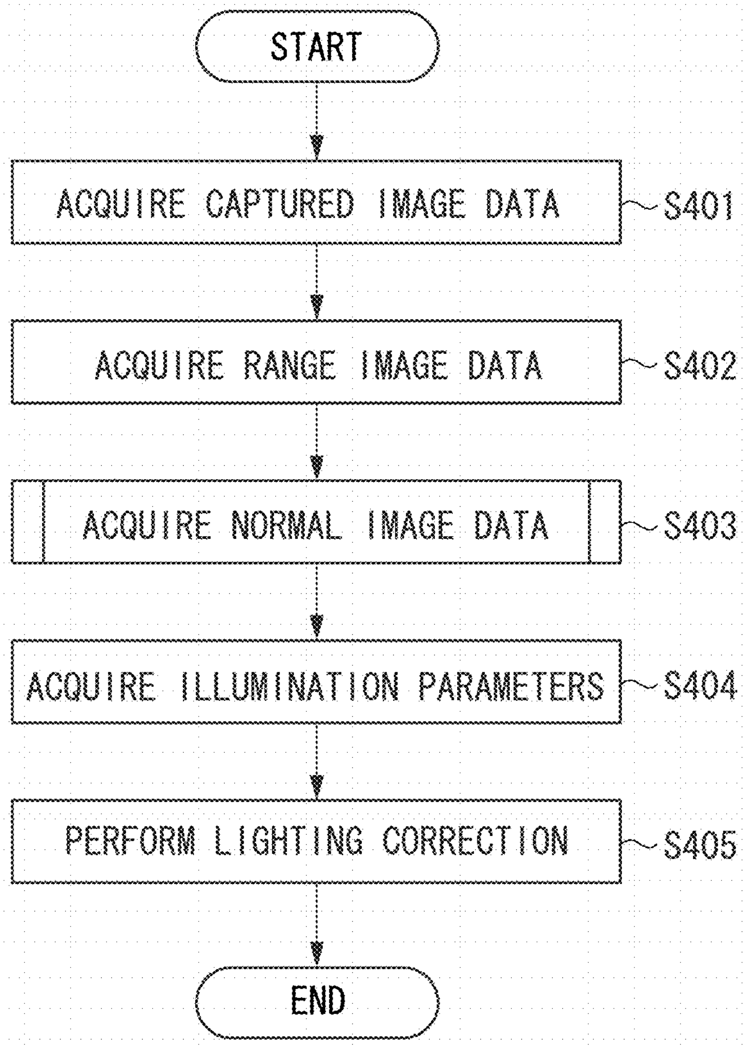
FIG. 4 is a flowchart illustrating an operation of the image processing unit according to the first exemplary embodiment.

FIG. 3 is a block diagram illustrating a functional configuration of the image processing unit 210. The image processing unit 210 serves as each block illustrated in FIG. 3, when being controlled by the CPU 201 executing a program stored in the ROM 203. FIG. 4 is a flowchart illustrating the operation of the image processing unit 210. Processing to be performed by the image processing unit 210 will be described below with reference to FIGS. 3 and 4.

In step S401, an image acquisition unit 301 acquires captured image data representing an image captured by the imaging unit 102. The image acquisition unit 301 outputs the acquired captured image data to a lighting unit 305.

Next, in step S402, a distance acquisition unit 302 acquires range image data. The range image data is data indicating a distance from a subject to the imaging apparatus 101, at each pixel position in image data. In the present exemplary embodiment, the range image data is a 256-step gradation monochrome image. In the range image data, the pixel value of a pixel corresponding to a subject at a short distance from an imaging apparatus is large, and the pixel value of a pixel corresponding to a subject at a long distance from an imaging apparatus is small. The format of the range image data is not limited to this, and may be, for example, a table storing distance information of a subject at each pixel position.

Now, a method for acquiring the range image data will be described. The range image data can be acquired using a stereo matching method. The stereo matching method detects corresponding points of a subject that are identical object points, from pieces of image data of different viewpoints, and calculates a distance by the principle of triangulation, based on the difference between the corresponding points in the respective pieces of image data. Other usable methods include a time of flight (TOF) method and a pattern projection method. The TOF method calculates a distance, based on the time from emission of light toward a subject to receipt of the light reflected from the subject. The pattern projection method emits light of a pattern to a subject, and calculates a distance based on a displacement of the pattern. In the present exemplary embodiment, it is assumed that the range image data is acquired by the TOF method. The imaging apparatus 101 causes the light emitting unit 105 to emit light toward a subject at a start of image capturing, and the imaging unit 103 receives the light reflected from the subject. The range image data is generated based on the time from the emission of the light to the receipt of the light reflected from the subject. The range image data may be acquired by a known method other than the above-described methods. The distance acquisition unit 302 generates the range image data based on the data input from the imaging unit 103, and outputs the generated range image data to the lighting unit 305.

Next, in step S403, a normal acquisition unit 303 calculates normal image data. The normal image data is data indicating a normal vector with respect to a surface of a subject, at each pixel position in image data. In the present exemplary embodiment, the normal image data is a 256-step gradation color image, and expresses a direction vector defined in a coordinate system including a subject, as a pixel value. The format of the normal image data is not limited to this, and may be, for example, a table storing normal information of a subject in each pixel.

Now, a method for calculating the normal image data will be described. The normal image data can be calculated by a method of performing differentiation with respect to a target pixel of the range image data from a neighboring region, or a method of applying a plane. The normal image data can also be calculated by a method of transforming normal image data of a typical face shape stored beforehand in the ROM 203, according to a shape or facial expression of a subject. In the present exemplary embodiment, it is assumed that normal image data of a typical face shape is stored in the ROM 203, and the normal image data is calculated by the method of transforming the normal image data of the typical face shape, according to a subject. This normal image data generation method will be described in detail below.

Figure 5A:
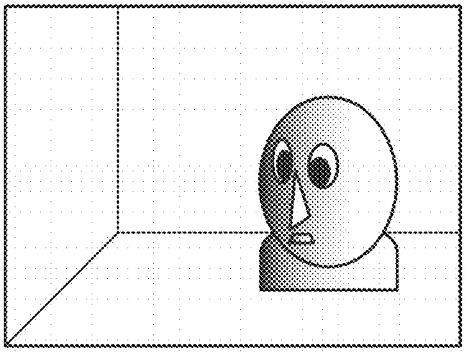
FIGS. 5A, 5B, and 5C are diagrams each illustrating an example of image data according to the first exemplary embodiment.
Figure 5B:
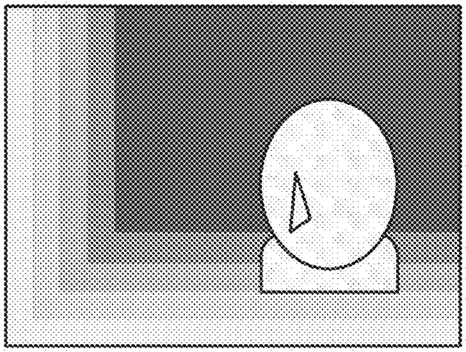
Figure 5C:
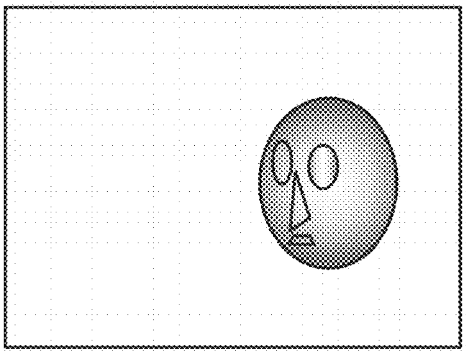

FIGS. 5A, 5B, and 5C are diagrams each illustrating an example of image data in the present exemplary embodiment. FIG. 5A illustrates the captured image data acquired in step S401. FIG. 5B illustrates the range image data acquired in step 402. FIG. 5C illustrates the normal image data calculated in step S403. Here, the captured image data is defined as I, the range image data is defined as P, the normal image data is defined as N, and the respective values corresponding to a pixel (i, j) are assumed to be I(i, j), P(i, j), and N(i, j). Further, the captured image data and the normal image data are both color image data, and thus expressed as I(i, j)=(Ir(i, j), Ig(i, j), Ib(i, j)), and N(i, j)=(Nx(i, j), Ny(i, j), Nz(i, j)), respectively. The normal acquisition unit 303 outputs the acquired normal image data to the lighting unit 305.

Next, in step S404, an illumination acquisition unit 304 acquires illumination parameters of virtual illumination to be use for lighting processing. The illumination parameter is a variable representing each of a color of illumination, brightness of the illumination, and a position as well as an orientation of the illumination. In the present exemplary embodiment, it is assumed that the color of the illumination is 256-step gradation RGB values, and the brightness of the illumination is a positive real number value. Further, each of the position and the orientation of the illumination is a three-dimensional real number value, and expressed as coordinates and a direction vector in a space defined in a coordinate system including a subject. Here, the color of the illumination is defined as L, the brightness of the illumination is defined as $\alpha$, the position of the illumination is defined as Q, and the orientation of the illumination is defined as U. It is assumed that the color of the illumination, the position of the illumination, and the orientation of the illumination are expressed as L=(Lr, Lg, Lb), Q=(Qx, Qy, Qz), and U=(Ux, Uy, Uz), respectively.

Figure 6:
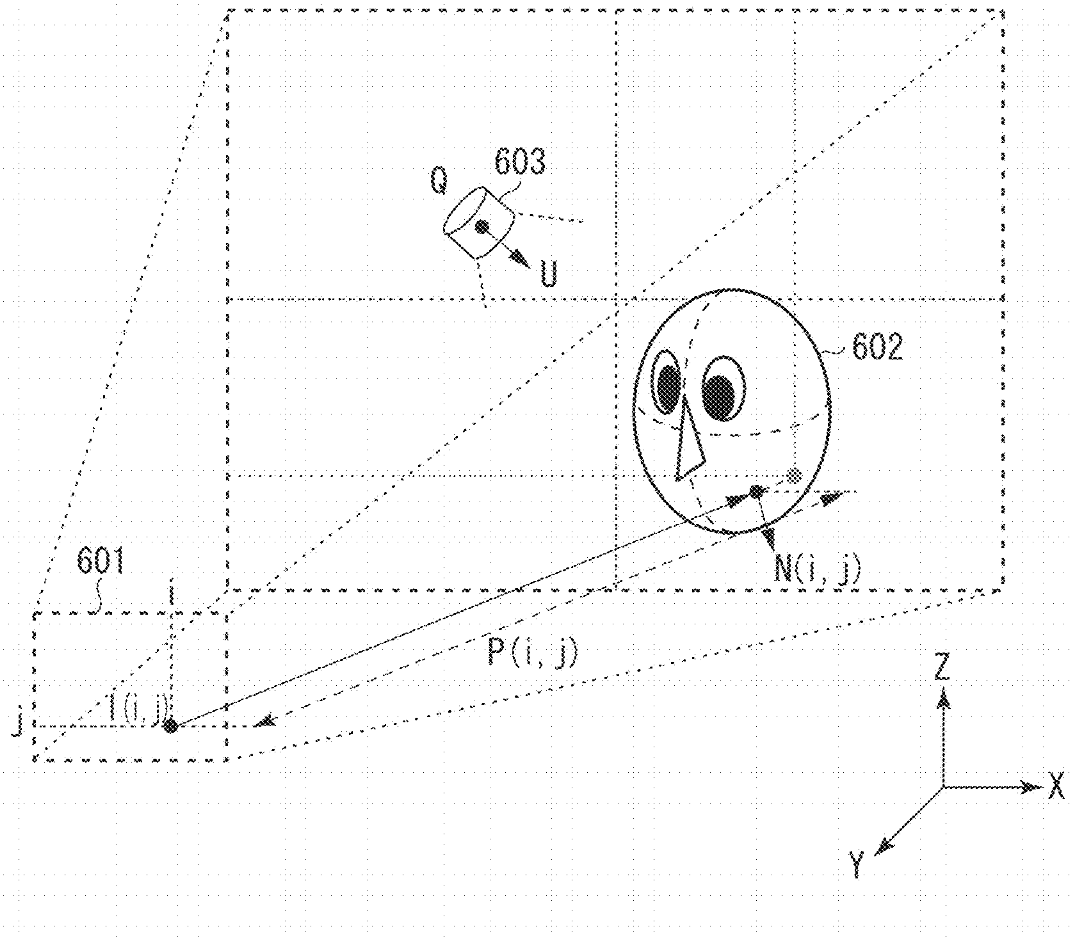
FIG. 6 is a diagram illustrating an example of a positional relationship between the imaging apparatus or device, and a subject as well as illumination, according to the first exemplary embodiment.

Now, a positional relationship between an imaging apparatus, and a subject as well as illumination will be described with reference to FIG. 6. FIG. 6 illustrates a virtual space including an imaging apparatus 601, a subject 602, and an illuminator 603. A rightward direction is an X-axis, a frontward direction is a Y-axis, and an upward direction is a Z-axis. The imaging apparatus 601 represents a virtual sensor plane, and the value I(i, j) corresponding to the pixel (i, j) is defined in a manner illustrated in FIG. 6. Similarly, the normal N(i, j) and the distance P(i, j) each corresponding to the pixel (i, j) are defined in a manner illustrated in FIG. 6. The illuminator 603 is a virtual light source that is not real, and the position Q and the orientation U of the illumination are defined in a manner illustrated in FIG. 6. The illumination acquisition unit 304 sets the acquired illumination parameters, as illumination parameters to be used for the lighting processing, and outputs the illumination parameters to the lighting unit 305.

Lastly, in step S405, the lighting unit 305 performs lighting correction processing on the image data input from the image acquisition unit 301. The lighting correction processing is processing for correcting a pixel value of the captured image data by using the range image data and the normal image data, as if lighting based on the illumination parameters is applied to the subject. In the present exemplary embodiment, it is assumed that the captured image data is corrected according to an expression (1).

$$Ir'(i,j)=Ir(i,j)+kr(i,j)\times Lr\times Ir(i,j)$$

$$Ig'(i,j)=Ig(i,j)+kg(i,j)\times Lg\times Ig(i,j)$$

$$Ib'(i,j)=Ib(i,j)+kb(i,j)\times Lb\times Ib(i,j) \quad (1)$$

Here, image data after the image processing is defined as I', and a value corresponding to the pixel (i, j) is therefore I'(i, j), and expressed as I'(i, j)=(Ir'(i, j), Ig'(i, j), Ib'(i, j)). Further, k(i, j) can be calculated, for example, by an expression (2), based on the brightness, the position, and the orientation of the illumination, as well as the distance information and the normal information corresponding to the pixel (i, j).

$$k(i,j)=t\times\alpha\times K(\rho)\times(N(i,j),V(i,j))/(W(P(i,j)),Q)) \quad (2)$$

Here, t is an arbitrary constant, and ρ is an angle formed by the orientation U of the illumination, and a straight line, which connects the position of the subject corresponding to the pixel (i, j) with the position Q of the illumination. K(ρ) is a function returning a value that increases with decrease in the angle ρ. Further, V(i, j) is a unit vector that represents a direction from the position of the subject corresponding to the pixel (i, j) to the position Q of the illumination. W(P(i, j)),Q) is a function returning a value that increases with increase in the distance from the position of the subject corresponding to the pixel (i, j) to the position Q of the illumination. The expression to be used for the lighting processing is not limited to an expression of performing addition for a pixel value as a distance from a light source becomes shorter, such as the one described above. Alternatively, there may be used, for example, an expression of performing subtraction for a pixel value of captured image data as a distance from a light source becomes longer. If such an expression is used, natural shade can be added to image data that results from image capturing performed in a state with an excessive light amount.

Figure 7:
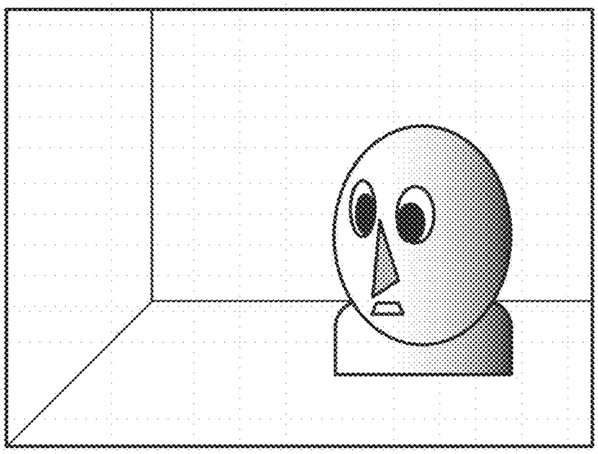
FIG. 7 is a diagram illustrating an example of image data after lighting correction processing according to the first exemplary embodiment.

FIG. 7 is a diagram illustrating an example of image data after the lighting correction processing according to the present exemplary embodiment. Shade that produces a three-dimensional effect, as if an object is lighted with illumination from a desired position, can be added to the captured image data illustrated in FIG. 5A.

An outline of the processing performed in the imaging apparatus 101 according to the present exemplary embodiment has been described above. The above-described processing can generate, from the captured image data, image data representing an image as if the image is captured under illumination conditions desired by a user. Therefore, even if image capturing is performed under unsuitable illumination conditions such as spotlight illumination and backlight, it is possible to generate image data in which the illumination conditions are changed to suitable illumination conditions after the image capturing. The processing (step S403) performed by the normal acquisition unit 303 will be described in detail below.

<Normal Acquisition Unit>

Figure 8:
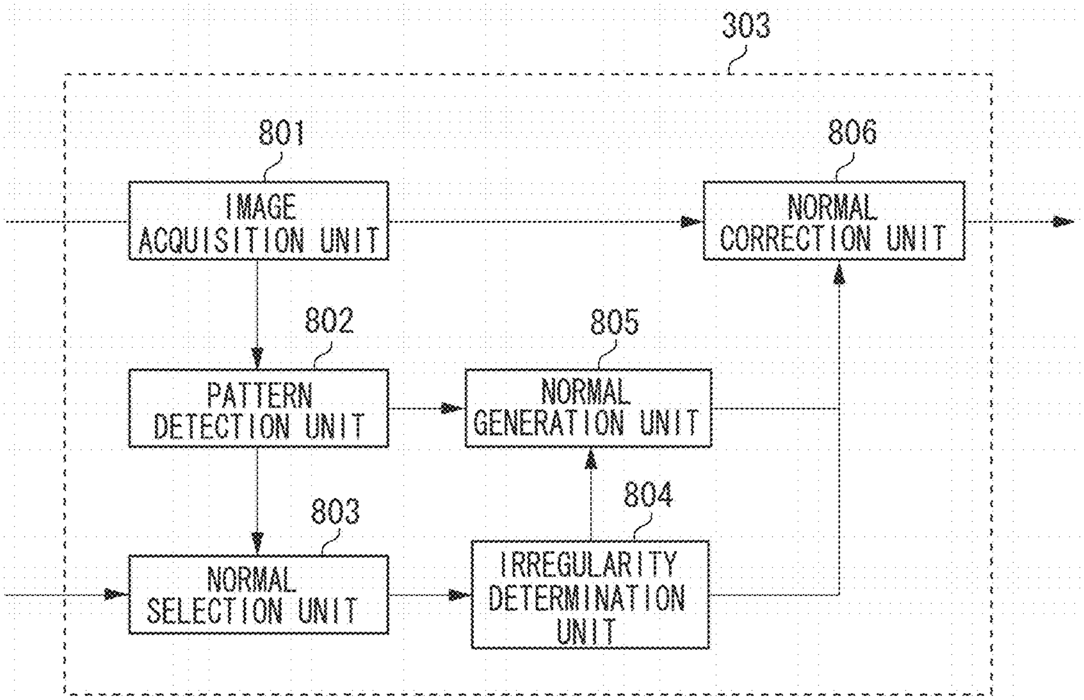
FIG. 8 is a block diagram illustrating a configuration of a normal acquisition unit according to the first exemplary embodiment.
Figure 9:
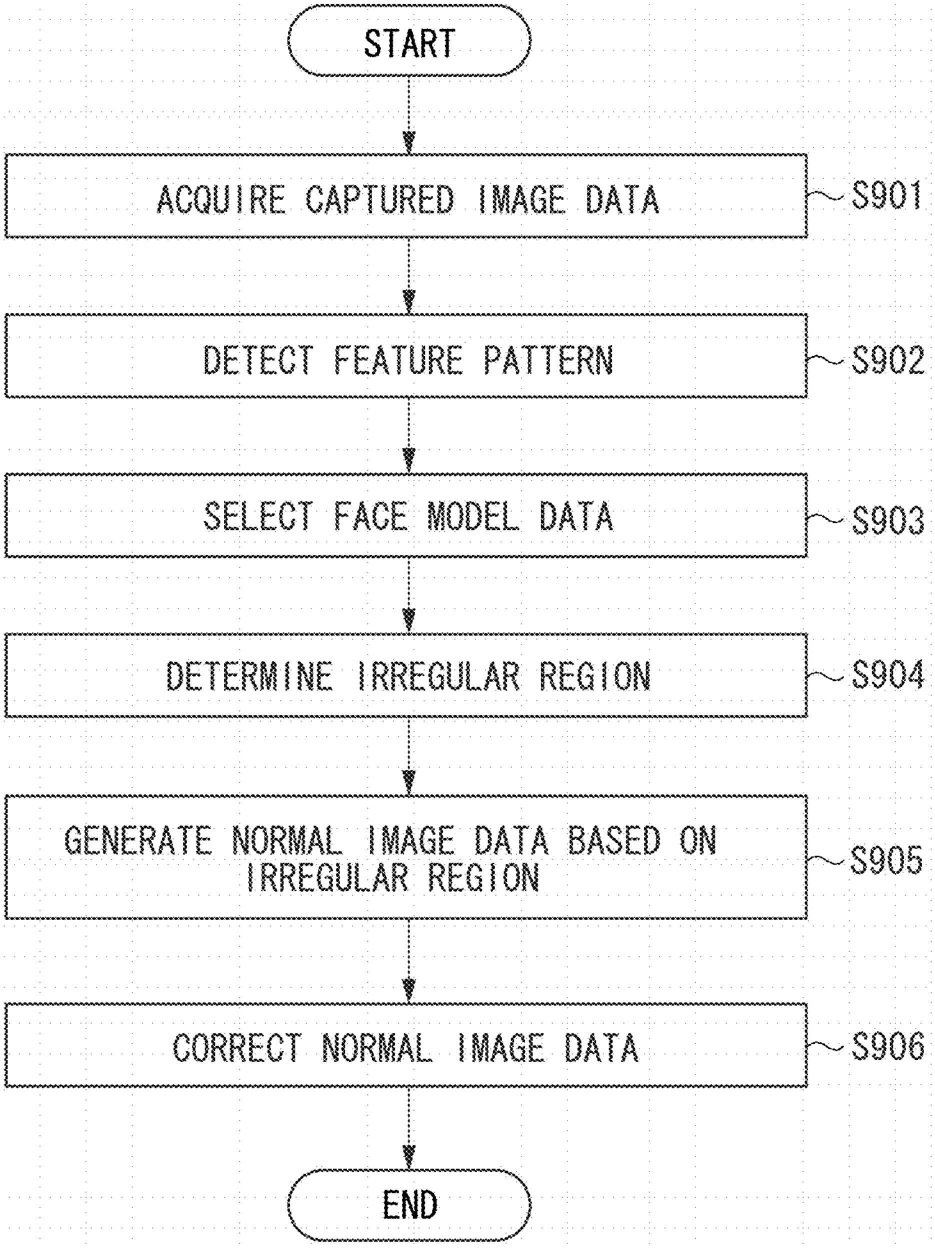
FIG. 9 is a flowchart illustrating an operation of the normal acquisition unit according to the first exemplary embodiment.

Next, a method for calculating the normal information by transforming the normal image data of the typical face shape according to the subject will be described. FIG. 8 is a block diagram illustrating a functional configuration of the normal acquisition unit 303. Further, FIG. 9 is a flowchart illustrating an operation of the normal acquisition unit 303. Details of the processing (step S403) performed by the normal acquisition unit 303 will be described, with reference to the block diagram illustrated in FIG. 8 and the flowchart illustrated in FIG. 9.

First, in step S901, an image acquisition unit 801 acquires the captured image data acquired in step S401. The image acquisition unit 801 outputs the acquired captured image data to a pattern detection unit 802 and a normal correction unit 806.

Next, in step S902, the pattern detection unit 802 detects a feature pattern of the subject. In the present exemplary embodiment, the pattern detection unit 802 detects a human face from the captured image data. In the present exemplary embodiment, it is assumed that the ROM 203 stores beforehand a database generated by learning a feature of a face image, and the pattern detection unit 802 detects a face by, for example, template matching, using the database stored in the ROM 203. The feature pattern detected here is not limited to the face, and various objects such as a character written on a subject can be used. The pattern detection unit 802 acquires subject information indicating an organ position of each part such as eyes and a nose and a direction of the face in the captured image data, and outputs the subject information to a normal selection unit 803 and a normal generation unit 805. The method for acquiring the subject information is not limited to this method. For example, the user may input organ positions and a direction of the face while viewing the captured image.

Figure 10:
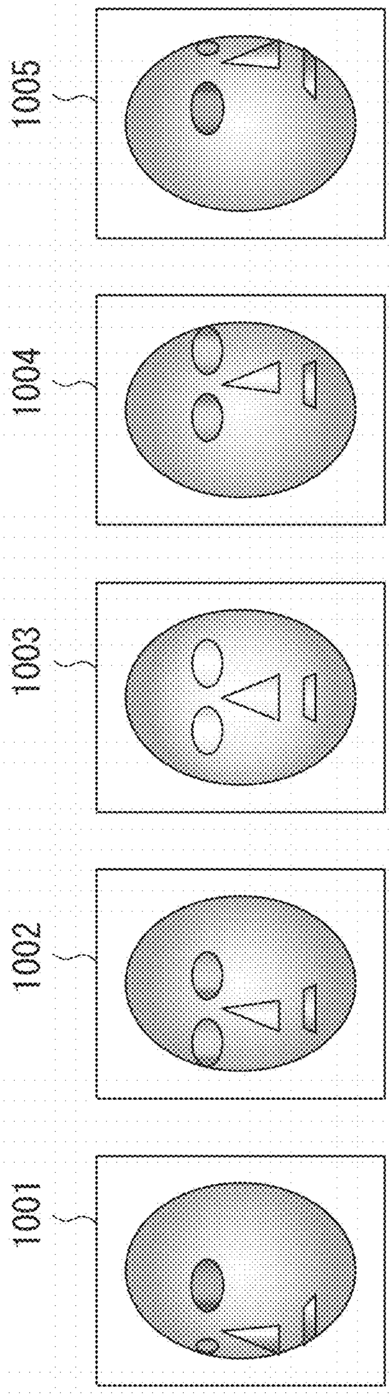
FIG. 10 is a diagram illustrating examples of face model data according to the first exemplary embodiment.

Next, in step S903, the normal selection unit 803 selects normal image data to be used for the lighting processing, from the pieces of normal image data of the typical face shape stored in the ROM 203. The normal image data of the typical face shape will be hereinbelow referred to as "face model data". In the present exemplary embodiment, the face model data, which corresponds to each of a plurality of different directions of the face, is stored beforehand in the ROM 203. Based on the direction of the face detected in step S902, the normal selection unit 803 selects the face model data indicating the closest direction of the face to the direction of the detected face. FIG. 10 is a diagram illustrating examples of the face model data. In FIG. 10, the face model data (each of data 1001 to data 1005) is generated so that an angle is changed in such a manner that the highest positions of a nose are laterally arranged at equal intervals in the data 1001 to data 1005. When the typical face shape is an oval shape having a protruding nose, a nose region around the nose changes most according to the change of the angle, in the face model data. Therefore, it is desirable to provide a plurality of pieces of data as the face model data based on the position of a nose. However, if such face model data cannot be prepared, there may be provided face model data including a plurality of pieces of data corresponding to the respective faces arranged at equal angles. The normal selection unit 803 outputs the selected face model data to an irregularity determination unit 804.

Next, in step S904, the irregularity determination unit 804 determines an irregular region and an outline region of the face model data. The irregular region of the face model data is a region with a steep change in the face model data, and corresponds to an organ region of a part such as an eye and a nose, when a face region is a target. In the present exemplary embodiment, it is assumed that the ROM 203 stores beforehand an irregular region and an outline region corresponding to each of the face model data, and the stored data is read out. For example, the ROM 203 stores positions of a nose, eyes, and a mouth in each of the face model data. A part around the nose in particular has a large irregularity. Therefore, it is assumed that this part is the irregular region. It is assumed that pixel positions corresponding to the outermost part of a face in the face model data are stored as the outline region. The method for determining the irregular region and the outline region is not limited to this method. For example, the irregular region may be determined using a database as in step 902. Alternatively, the irregular region may be determined as follows. First, the face model data is differentiated with respect to each of an x component, a y component, and a z component. Subsequently, a region, in which the degree of a change in at least one of these three components exceeds a predetermined threshold, is determined as the irregular region. Still alternatively, the irregular region may be determined as follows. First, the face model data is differentiated in a range of a predetermined number of pixels around a point determined as a reference point for position adjustment, and then, the size of a shape change around the reference point is derived by differentiating the face model data. Based on the size of the derived shape change, an organ position having a large irregularity is determined as the irregular region. The irregularity determination unit 804 outputs information indicating the face model data, the organ positions in the face model data, and the irregular region, to the normal generation unit 805.

Figure 11A:
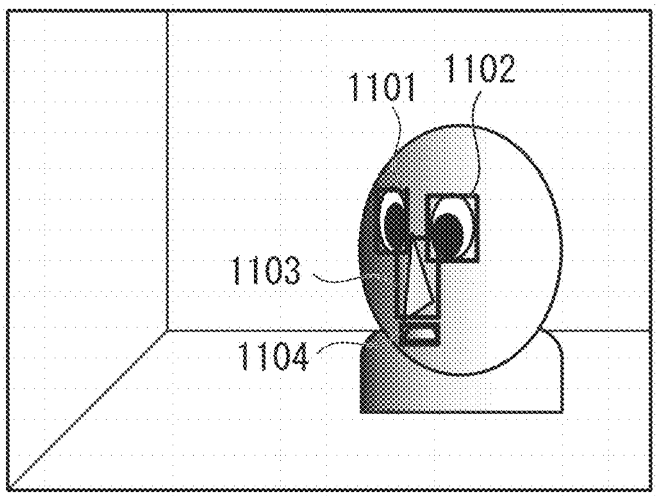
FIGS. 11A and 11B are diagrams illustrating an example of each organ position in captured image data, and an example of an irregular region in face model data, respectively, according to the first exemplary embodiment.
Figure 11B:
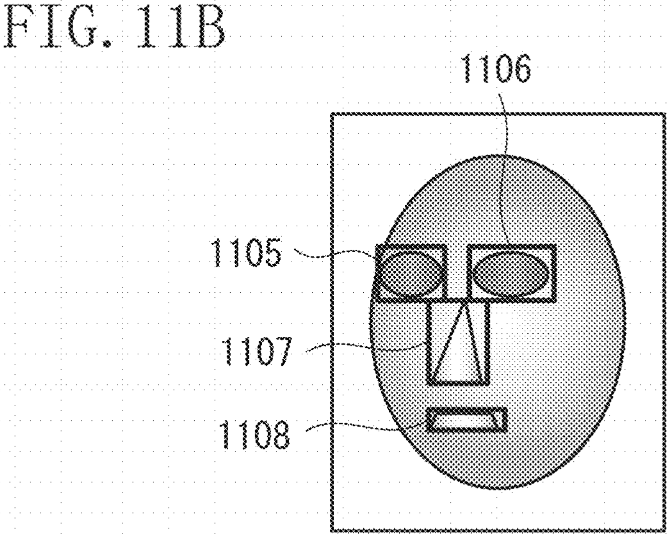

In step S905, the normal generation unit 805 generates the normal image data, based on the irregular region determined in step S904. In the present exemplary embodiment, projective transformation of the face model data is performed, based on the organ positions in the face indicated by the subject information input from the pattern detection unit 802, and the organ positions as well as the irregular region in the face model data input from the irregularity determination unit 804. FIGS. 11A and 11B are diagrams illustrating examples of the organ position in the captured image data and that in the face model data, respectively. In the captured image data illustrated in FIG. 11A, a right eye 1101, a left eye 1102, a nose 1103, and a mouth 1104 are the detected organ positions. In the face model data illustrated in FIG. 11B, a right eye 1105, a left eye 1106, a nose 1107, and a mouth 1108 are the detected organ positions, and the nose 1107 is determined as the irregular region. Based on a correspondence relationship between these organ positions, a transformation matrix for performing the projective transformation of the face model data can be calculated.

The normal generation unit 805 generates the transformation matrix for the projective transformation by using a least squares method based on a difference between the organ positions, in such a manner that the organ position in the captured image data and the corresponding organ position in the face model data become close to each other. In other words, the organ positions are each determined as a reference point to be used for position adjustment, and the normal generation unit 805 performs the position adjustment between the captured image data and the face model data, to reduce the difference between the reference point in the captured image data and the corresponding reference point in the face model data. In this process, the normal generation unit 805 calculates the transformation matrix by using the least squares method in which a high weight is assigned to the position of the nose so that the position of the nose determined as the irregular region and the position of the nose in the captured image data become closest to each other. In other words, a larger value is assigned to the difference between the positions of the noses, as an evaluation value indicating the difference. This means that the normal generation unit 805 places greater importance on the degree of agreement between the positions of the noses than on the degree of agreement between the other corresponding organ positions, in the generation of the transformation matrix. This is because the nose region has the largest change in the normal in the face region, and if there is a difference between the positions of the noses, a high degree of strangeness or abnormality may appear after the lighting processing. The above-described processing can reduce strangeness that appears in an image after the lighting processing, even if there is a positional difference between three-dimensional shape data and captured image data.

In the present exemplary embodiment, the face model data is subjected to the projective transformation to match with the captured image data. However, the position adjustment between the face model data and the captured image data is not limited to the projective transformation, and translation may be adopted. In the case where the translation is adopted, the normal generation unit 805 determines an amount of displacement for normal model data, by using a weighted least squares method based on a distance of each organ position. According to this processing, a workload can be reduced to be less than a workload in the case where the transformation matrix of the projective transformation is determined. For example, this processing may be sufficient for a case where the face model data is stored using a small angle variation for every angle. The normal generation unit 805 generates the normal image data in which the face model data is arranged at the corresponding position in the captured image data, and outputs the generated normal image data to the normal correction unit 806. In the normal image data, it is assumed that N(i, j)=(0, 1, 0) is stored in all the regions not corresponding to the face model data.

Figure 12A:
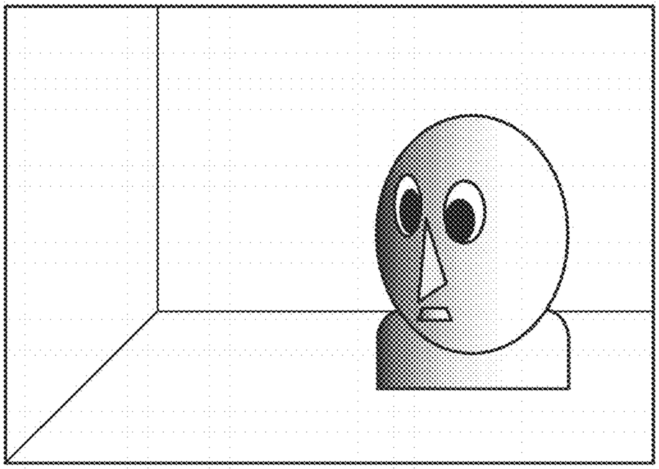
FIGS. 12A, 12B, and 12C are diagrams illustrating an example of correction processing for normal image data by using a cross bilateral filter according to the first exemplary embodiment.
Figure 12B:
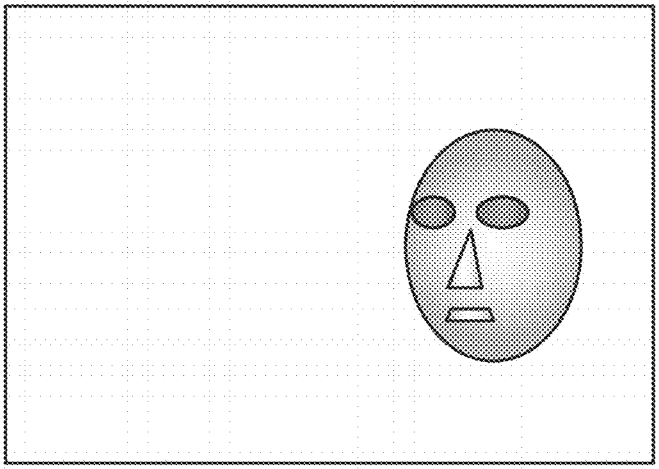
Figure 12C:
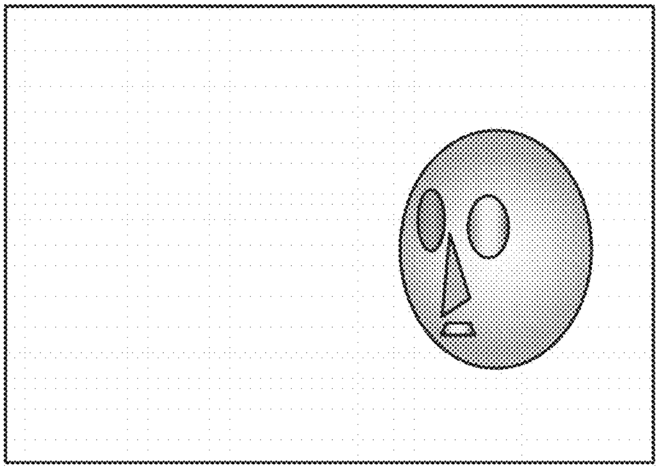

Lastly, in step S906, the normal correction unit 806 corrects the normal image data, based on the captured image data, and the outline region of the face model data. In the present exemplary embodiment, the normal image data is corrected by causing a cross bilateral filter based on the pixel value of the captured image data to act on the normal image data. The cross bilateral filter is a smoothing filter for assigning high weights to the pixels having the pixel values close to each other in the captured image data. The weight to each pixel in filtering processing is determined based on the pixel value of the captured image data and therefore, the normal image data is corrected to a shape closer to that of the captured image data. FIGS. 12A, 12B, and 12C are diagrams illustrating how a processing result is obtained by the cross bilateral filter. More specifically, FIG. 12A illustrates the captured image data, FIG. 12B illustrates the normal image data before the processing, and FIG. 12C illustrates the normal image data after the processing. As illustrated in FIG. 12C, it can be seen that the normal image data can be transformed to match with the outline of the captured image data, by filtering the normal image data illustrated in FIG. 12B with reference to the captured image data illustrated in FIG. 12A. The normal correction unit 806 outputs the normal image data for which the correction is completed, to the lighting unit 305, and then the processing ends. The filter used here is not necessarily the cross bilateral filter, and any type of filter may be used if the filter is a smoothing filter based on the pixel value of the captured image data. The outline of the processing performed in the normal acquisition unit 303 has been described above. According to the above-described processing, strangeness or slight abnormality that appears in an image after the lighting processing can be reduced, even if there is a positional difference between three-dimensional shape data and captured image data.

In the present exemplary embodiment, the image acquisition unit 301 serves as an image acquisition unit configured to acquire image data including a subject. The distance acquisition unit 302 serves as a distance acquisition unit configured to acquire distance information, which indicates a distance from an imaging apparatus capturing an image represented by the image data to the subject, for each pixel of the image data. The illumination acquisition unit 304 serves as a setting unit configured to set a position of a light source, in a scene indicated by the image data. The pattern detection unit 802 serves as a detection unit configured to detect, in the image data, a predetermined feature pattern of the subject, and to detect a position of each of a plurality of reference points to be used for position adjustment of data, based on the feature pattern.

Further, the ROM 203 serves as a holding unit configured to hold model data indicating a three-dimensional shape of a predetermined object having the predetermined feature pattern, and to hold information indicating a position of each of the plurality of reference points in the model data. The normal generation unit 805 serves as a position adjustment unit configured to perform position adjustment of the model data with the subject, based on the position of each of the plurality of reference points included in the model data, and the position of each of the plurality of reference points detected by the detection unit. The lighting unit 305 serves as a processing unit configured to perform lighting processing for correcting a pixel value of the image data, based on the model data for which the position adjustment is performed by the position adjustment unit, the distance information, and the position of the light source.

Further, the normal selection unit 803 serves as a selection unit configured to select model data corresponding to one of the plurality of directions, based on the position of each of the plurality of reference points in the model data, and the position of each of the plurality of reference points detected by the detection unit.

Further, the irregularity determination unit 804 serves as a determination unit configured to determine the first reference point and the second reference point from the plurality of reference points.

In the first exemplary embodiment, there is described the method for suppressing strangeness of the image data after the lighting processing, by preferentially registering the region having the large irregularity in the face model data. In a second exemplary embodiment, there will be described an example in which the normal image data is corrected to maintain a three-dimensional effect of an outline region of a subject by also using mask image data.

Figure 13:
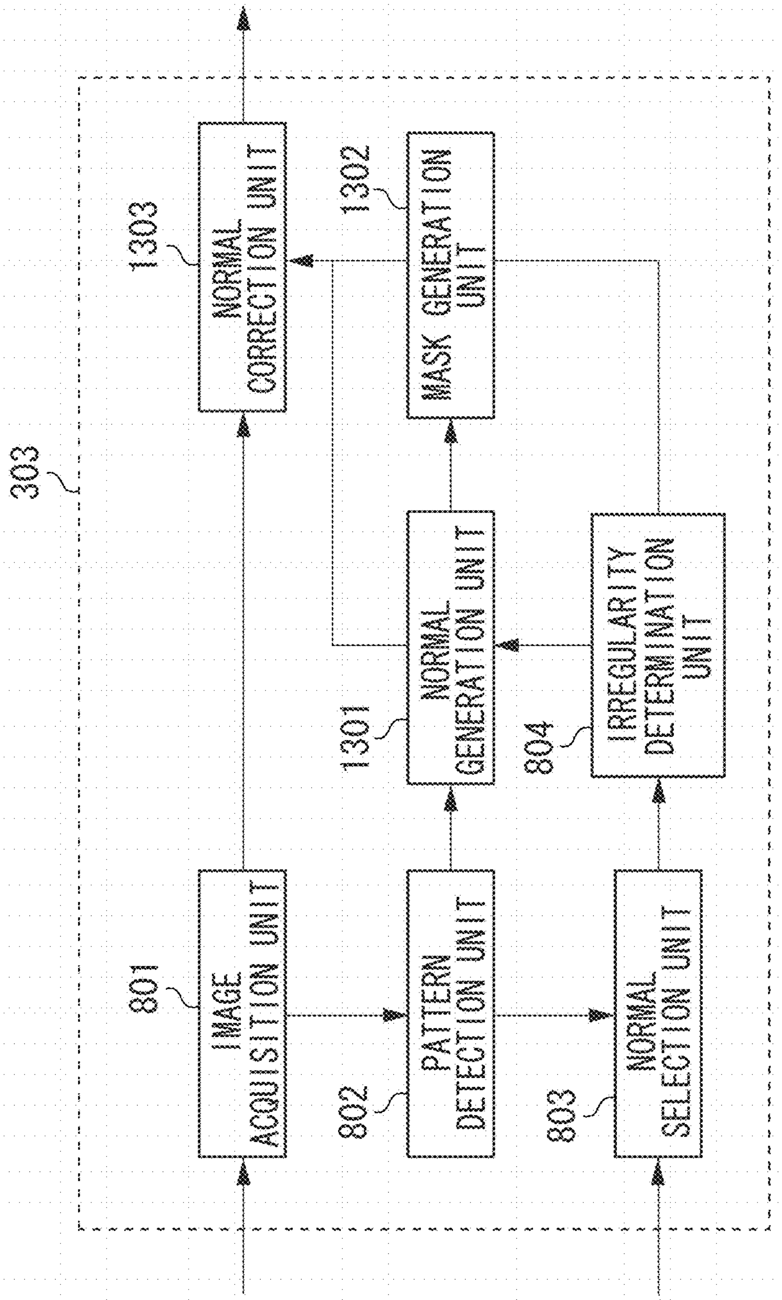
FIG. 13 is a block diagram illustrating a configuration of an image processing unit according to a second exemplary embodiment.
Figure 14:
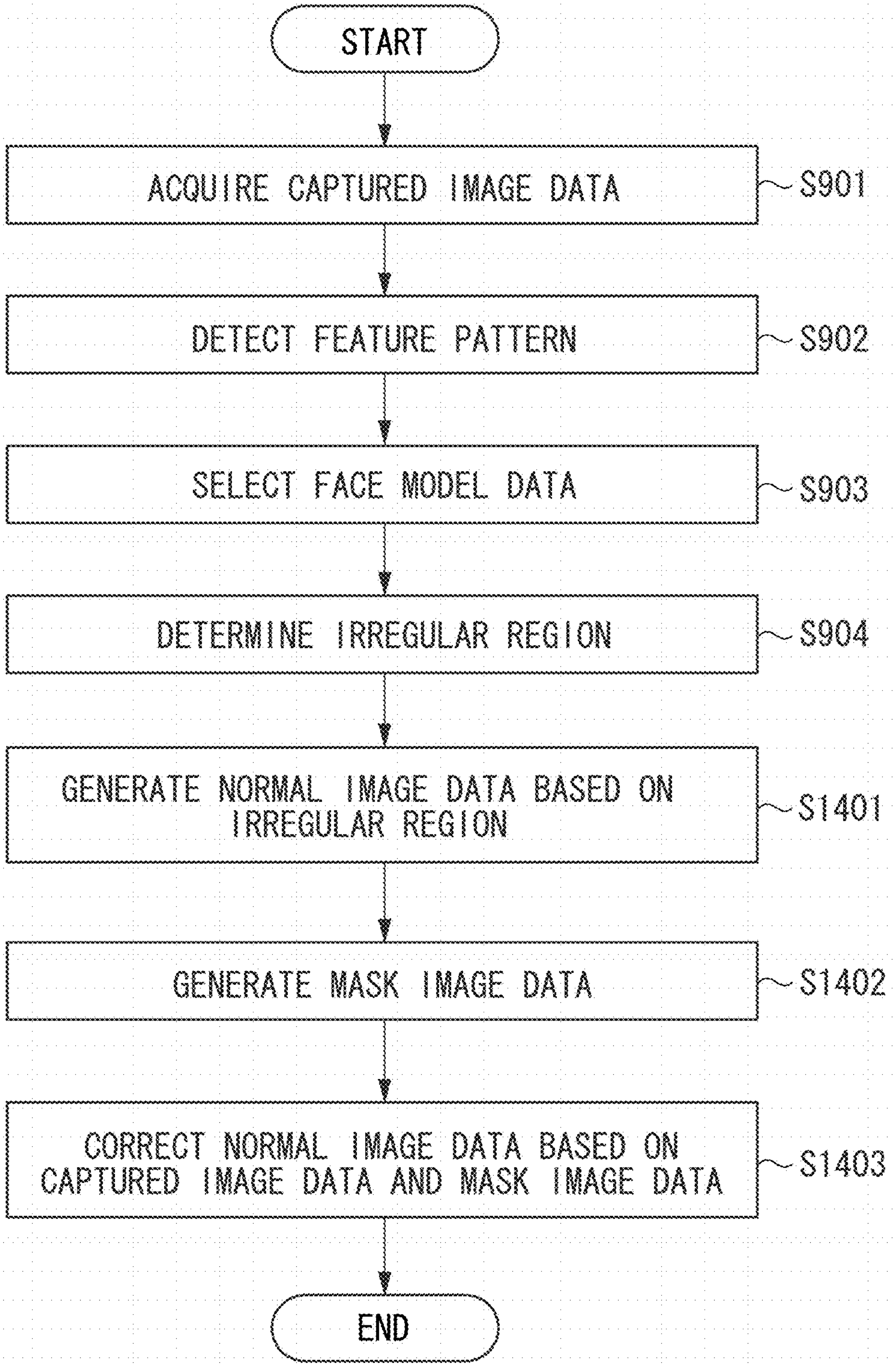
FIG. 14 is a flowchart illustrating an operation of the image processing unit according to the second exemplary embodiment.

FIG. 13 is a block diagram illustrating a configuration of the normal acquisition unit 303 according to the second exemplary embodiment. Further, FIG. 14 is a flowchart illustrating an operation of the normal acquisition unit 303 according to the second exemplary embodiment. Processing from step S901 to step S904 is similar to the processing from step S901 to step S904 in the first exemplary embodiment, and therefore will not be described. Brief description will be provided, focusing on a point different from the first exemplary embodiment.

In step S1401, a normal generation unit 1301 generates normal image data based on the irregular region determined in step S904. In the first exemplary embodiment, there is described the method for performing the projective transformation of the face model data, based on the organ positions of the face indicated by the subject information input from the pattern detection unit 802, and the organ positions as well as the irregular region in the face model data input from the irregularity determination unit 804. In the present exemplary embodiment, there will be described a method in which the normal generation unit 1301 performs projective transformation of the face model data, in such a manner that the face region in the face model data becomes smaller than the face regions in the captured image data.

Figure 15A:
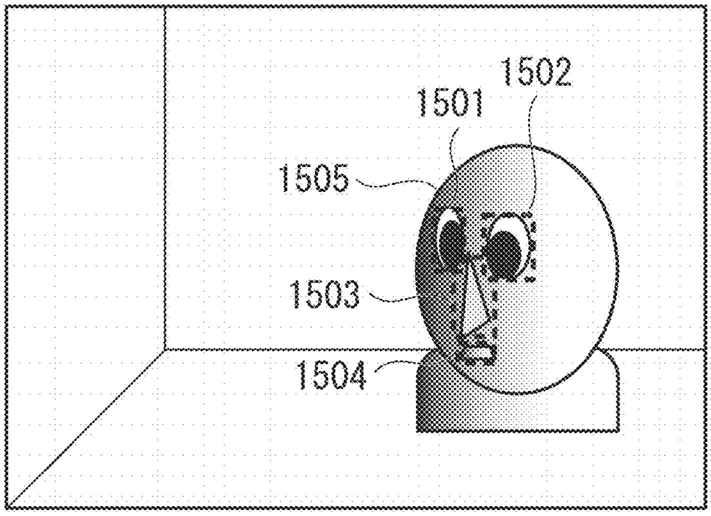
FIGS. 15A and 15B are diagrams illustrating an example of captured image data, and an example of face model data after projective transformation, respectively, according to the second exemplary embodiment.
Figure 15B:
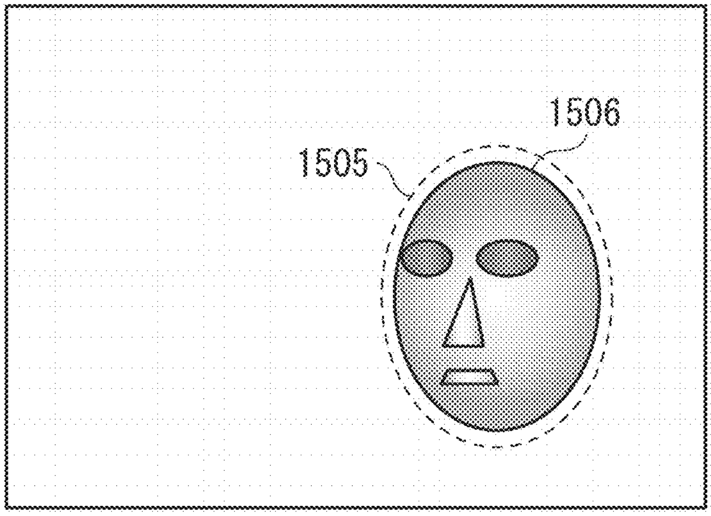

FIG. 15A is a diagram illustrating an example of the captured image data, and FIG. 15B is a diagram illustrating an example of the face model data after the projective transformation. In the captured image data illustrated in FIG. 15A, the organ positions of a right eye 1501, a left eye 1502, a nose 1503, and a mouth 1504, each indicated by a frame of a broken line, are moved from the original organ positions illustrated in FIG. 11A toward the nose side. This can be implemented by, for example, moving each of the detected organ positions toward the organ position of the nose at a certain ratio. In the face model data after the projective transformation illustrated in FIG. 15B, a face region 1506 after the projective transformation is smaller than a face region 1505 in the captured image data. This is because an effect of reduction transformation centering on the organ position of the nose can be obtained, by moving the organ position to be subjected to the projective transformation, from the original organ position, toward the nose side. A reason for this transformation, i.e., the projective transformation performed so that the face region in the face model data becomes smaller than the face region in the captured image data, will be described below in the description of processing to be performed by a normal correction unit 1303. The normal generation unit 1301 outputs the normal image data generated by the above-described processing of the projective transformation, to a mask generation unit 1302 and the normal correction unit 1303.

Figure 16A:
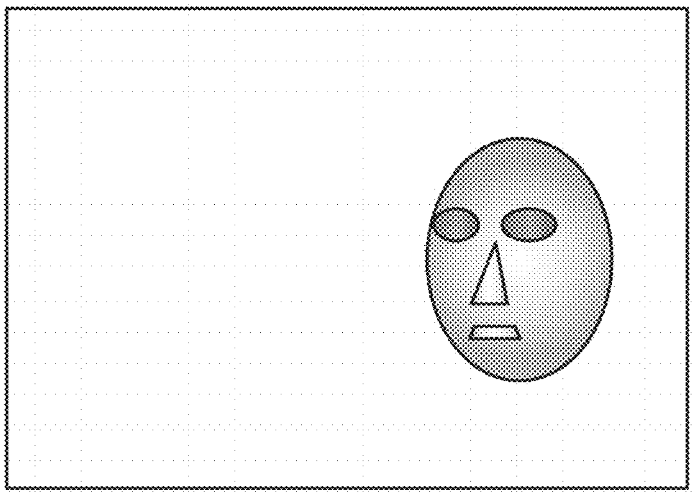
FIGS. 16A and 16B are diagrams illustrating an example of normal image data, and an example of mask image data, respectively, according to the second exemplary embodiment.
Figure 16B:
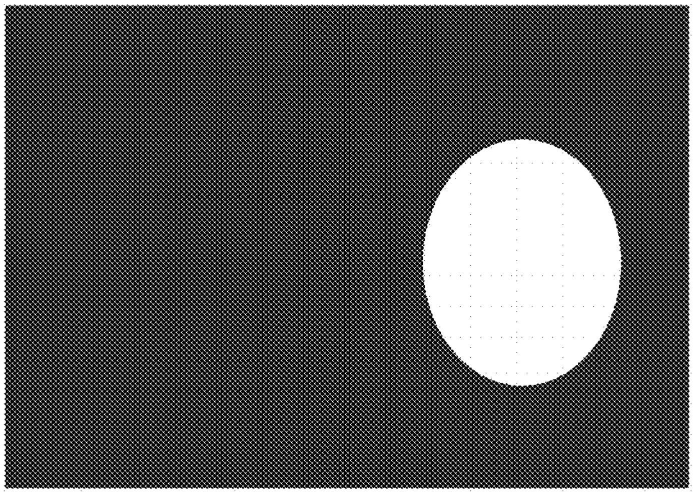

Next, in step S1402, the mask generation unit 1302 generates mask image data. FIG. 16A is a diagram illustrating an example of the normal image data, and FIG. 16B is a diagram illustrating an example of the mask image data. FIG. 16A illustrates the normal image data generated in step 1401, and FIG. 16B illustrates the mask image data calculated based on the normal image data. The mask image data is binary image data in which each pixel is expressed as 0 or 1, and black is displayed as 0 whereas white is displayed as 1. In the present exemplary embodiment, a mask image is generated in such a manner that each value in the background region of the normal image data is 0 and each value in the face region is 1 in the mask image data. More specifically, the value of a pixel having a pixel value of (0, 1, 0) in the normal image data may be expressed as 0 in the mask image data. The format of the mask image data is not limited to this type, and any format may be adopted if the format includes information capable of separating the background region and the face region of the normal image data. The mask generation unit 1302 outputs the generated mask image data to the normal correction unit 1303.

Lastly, in step S1403, the normal correction unit 1303 corrects the normal image data based on the captured image data and the mask image data. In the present exemplary embodiment, the normal correction unit 1303 corrects the normal image data, by using a cross bilateral filter based on the pixel value of the captured image data, like the first exemplary embodiment. The normal correction unit 1303 of the present exemplary embodiment uses the mask image data input from the mask generation unit 1302, in this filtering processing. More specifically, the cross bilateral filter processing is performed using only pixels each corresponding to the face region where the pixel values are 1 in the mask image data. Therefore, the normal information of the background is not used for the filtering in the outline region of the face region. Accordingly, a three-dimensional effect of the outline region can be maintained, as compared with the processing in the first exemplary embodiment.

Moreover, there is an effect of easy shaping the outline in the face model data according to the outline in the captured image data, by reducing the face region in the face model data to a size smaller than the face region in the captured image data. Therefore, the normal image data can be suitably corrected. The normal correction unit 1303 outputs the processed normal image data to the lighting unit 305, and then the processing ends.

The outline of the processing performed in the normal acquisition unit 303 according to the present exemplary embodiment has been described above. According to the-described processing, as compared with the processing in the first exemplary embodiment, the lighting processing that maintains the three-dimensional effect of the outline region can be performed.

In the second exemplary embodiment, there is described the method for correcting the normal image data based on the captured image data and the mask image data. In a third exemplary embodiment, there will be described an example in which the normal image data is corrected to maintain a three-dimensional effect by further using the range image data, even if a shielding object is present in front of a subject.

Figure 17:
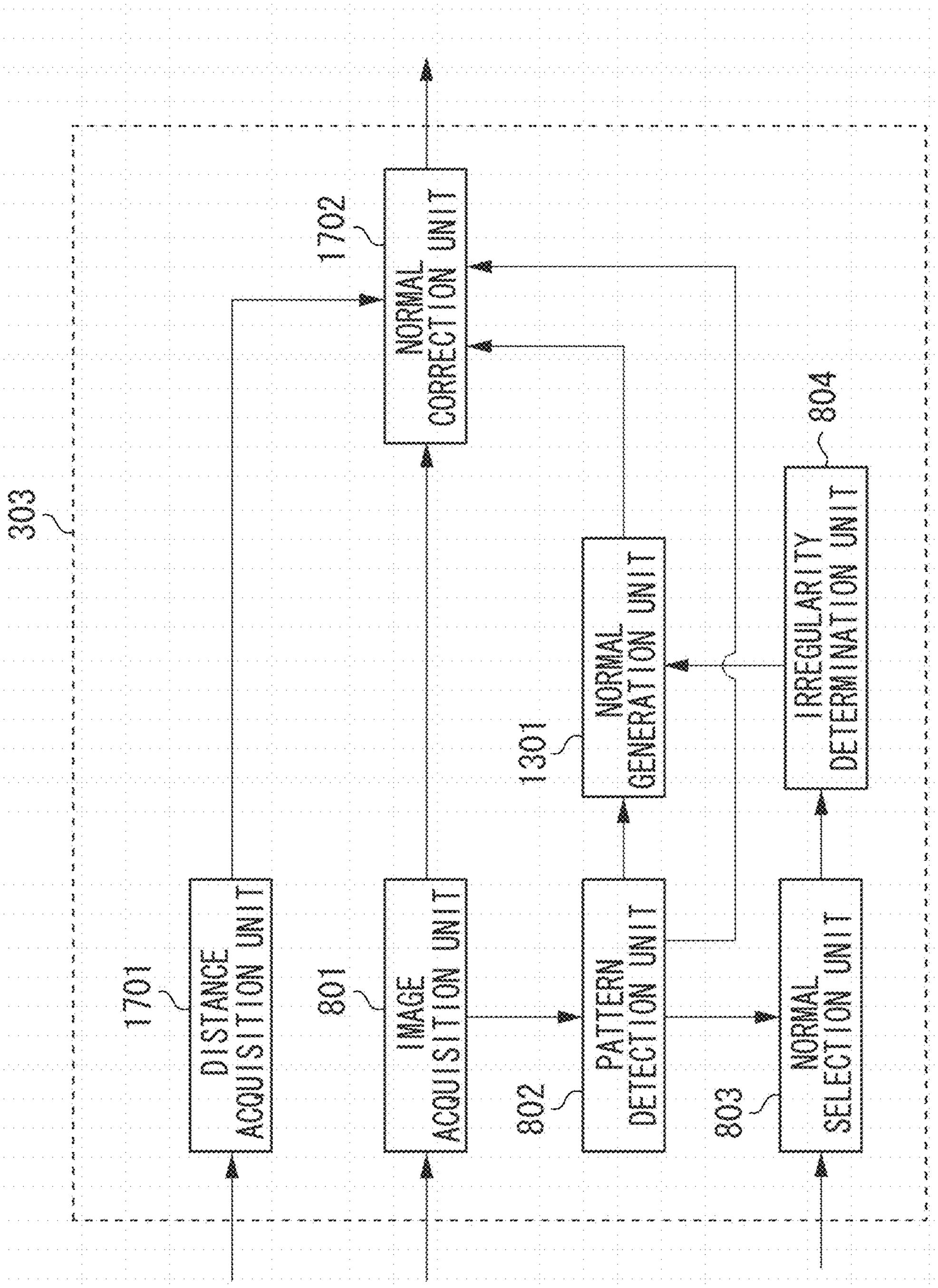
FIG. 17 is a block diagram illustrating a configuration of an image processing unit according to a third exemplary embodiment.
Figure 18:
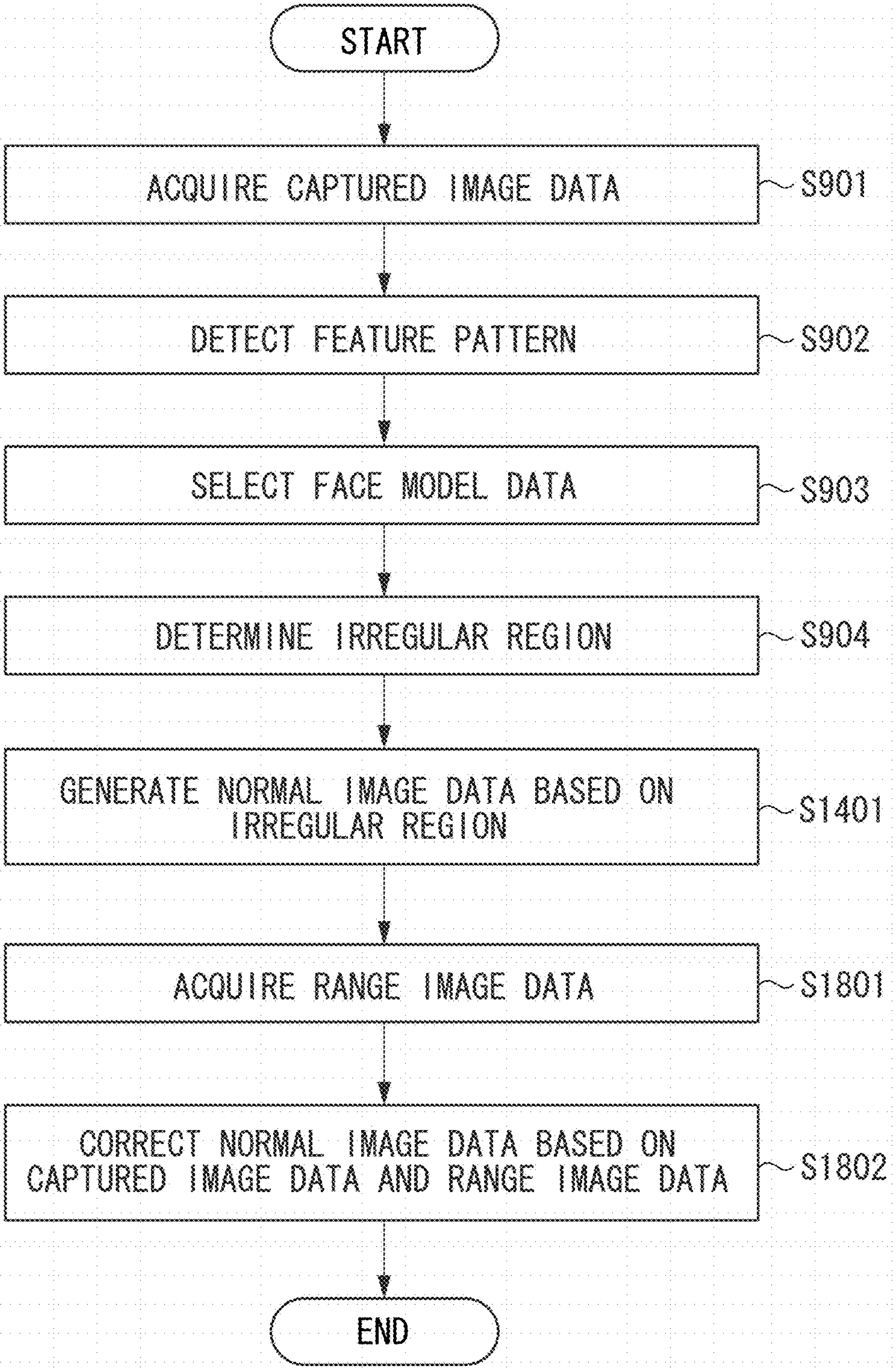
FIG. 18 is a flowchart illustrating an operation of the image processing unit according to the third exemplary embodiment.

FIG. 17 is a block diagram illustrating a configuration of the normal acquisition unit 303 according to the third exemplary embodiment. Further, FIG. 18 is a flowchart illustrating an operation of the normal acquisition unit 303 according to the third exemplary embodiment. Processing from step S901 to step S1401 is similar to the processing from step S901 to step S1401 in the second exemplary embodiment, and thus will not be described. Brief description will be provided, focusing on a point different from the second exemplary embodiment.

In step S1801, a distance acquisition unit 1701 acquires range image data from the distance acquisition unit 302. The range image data is similar to the range image data of the first exemplary embodiment and thus will not be described. The distance acquisition unit 1701 outputs the acquired range image data to a normal correction unit 1702.

Figure 19A:
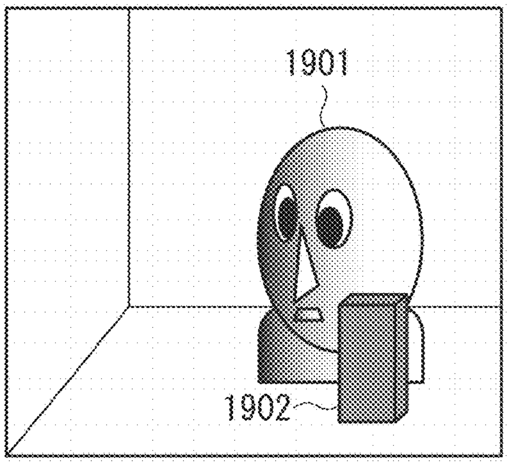
FIGS. 19A, 19B, 19C, and 19D are diagrams illustrating an example of captured image data, an example of range image data, an example of normal image data, and an example of normal image data, respectively, according to the third exemplary embodiment.
Figure 19B:
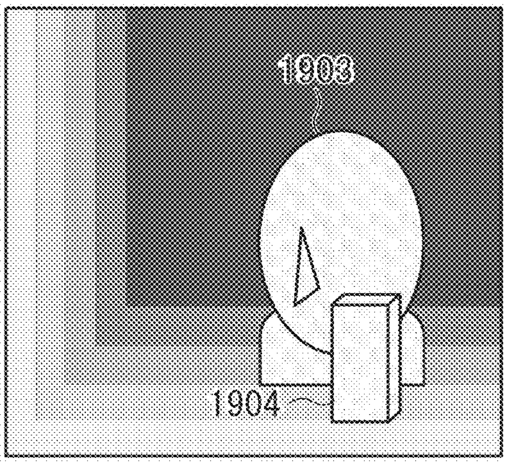
Figure 19C:
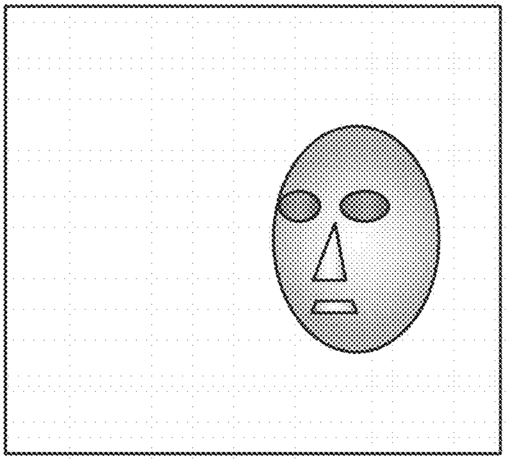
Figure 19D:
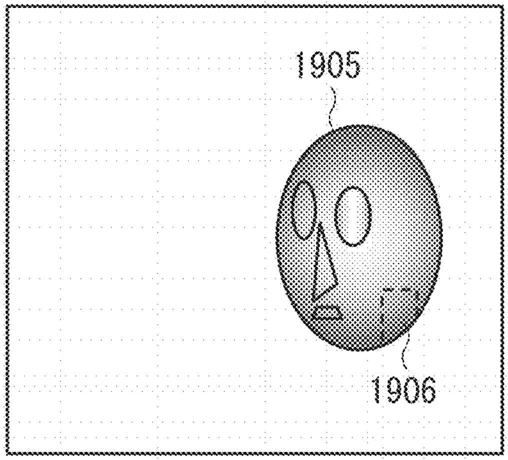

Next, in step S1802, the normal correction unit 1702 corrects the normal image data, based on the captured image data, the range image data, and the subject information. FIG. 19A is a diagram illustrating an example of the captured image data. FIG. 19B is a diagram illustrating an example of the range image data. FIGS. 19C and 19D are diagrams each illustrating an example of the normal image data. FIG. 19A illustrates the captured image data in which a shielding object 1902 is present between a subject 1901 and the imaging apparatus 101, and a part of the face region of the subject is covered by the shielding object 1902. FIG. 19B illustrates the range image data acquired in step S1801. In this range image data, distance information 1903 of the subject and distance information 1904 of the shielding object are different. FIG. 19C illustrates the normal image data, which is generated in step S1401 by the projective transformation of the face model data. In the present exemplary embodiment, the shielding object 1902 illustrated in FIG. 19A shields the part of the face region of the subject 1901. However, the present exemplary embodiment is not limited to this example, and is applicable to any case where a part of the face region of the subject is covered. For example, even in a case where a part of the face region is covered by a hand or body of the subject, processing similar to processing to be described below can be performed.

First, the normal correction unit 1702 determines whether a part of the face region of the subject is shielded by a shielding object. This determination can be performed using the subject information and the range image data. For example, the normal correction unit 1702 extracts the face region of the subject by using the subject information, and refers to the distance information of the region corresponding to the face region in the range image data. Next, the normal correction unit 1702 calculates an average of the distance information in the face region. The normal correction unit 1702 then determines whether the number of pixels, each of which indicates a distance smaller than the average by an amount equal to or greater than a predetermined threshold, exceeds a predetermined number. It can be determined that the part of the face region of the subject is covered by the shielding object, if the number of pixels, each of which indicates the distance smaller than the average by the amount equal to or greater than the threshold, exceeds the predetermined number. In the present exemplary embodiment, the distance information 1904 of the shielding object, which is different from the distance information 1903 of the subject, is included in the face region. Therefore, it can be determined that the part of the face region of the subject is covered by the shielding object. In a case where no part of the face region of the subject is covered by the shielding object, processing similar to the processing performed by the normal correction unit 1303 of the second exemplary embodiment may be performed and therefore, further description is omitted.

Next, if the part of the face region of the subject is covered by the shielding object, the normal correction unit 1303 performs smoothing processing. The smoothing processing is performed in such a manner that an intensity of smoothing in the shielded region corresponding to the shielding object is higher than an intensity of smoothing in other region in the face region. More specifically, for example, in the processing using a cross bilateral filter similar to that in the normal correction unit 806 of the first exemplary embodiment, the number of taps of the filter is increased in the shielded region. If the mask processing in the second exemplary embodiment is performed, the smoothing can be intensified by not performing the mask processing in the shielded region. The method for increasing the degree of the smoothing is not limited to the above-described methods, and other methods may be used. For example, the shielded region may be extracted, and different types of smoothing processing may be applied to the shielded region and other regions in the face region, respectively. According to the processing described in the present exemplary embodiment, there is no need to add new correction processing, and therefore, the cost can be maintained to be low. FIG. 19D illustrates the normal image data after the correction processing. In this normal image data, the normal of a shielded region 1906 is highly smoothed. Such an area in which the normal is to be highly smoothed is not limited to the shielded region as in the present exemplary embodiment. For example, in a case where the pattern detection unit 802 is capable of obtaining reliability of a detection result of the organ positions of parts such as eyes and a nose, the smoothing processing in the entire face region may be intensified when the reliability is low. The outline of the processing performed in the normal correction unit 1303 of the present exemplary embodiment has been described above. According to the above-described processing, an influence of the normal of the face model data on the shielding object can be suppressed, and more natural lighting processing can be performed.

The above-described exemplary embodiment is described using the example in which the normal image data of a predetermined face is stored as the face model data in the ROM 203, and the position of the face model data is adjusted with that of the face detected in the captured image data. However, a case to which the exemplary embodiments are applicable is not limited thereto. For example, the exemplary embodiments of the disclosure are applicable to an example in which the normal image data of an object, on which an identification code for position adjustment is printed, is stored as three-dimensional model data. Position adjustment of the three-dimensional model data is performed using an identification code detected in the captured image data. In this case as well, suitable lighting can be executed by performing position adjustment based on the size of an irregularity around each of a plurality of reference points detected in the identification code.

A fourth exemplary embodiment is directed to obtaining an image to which shade and shadow suitable for an orientation and a facial expression of a subject is added.

<External Appearance of Imaging Apparatus>

Figure 20A:
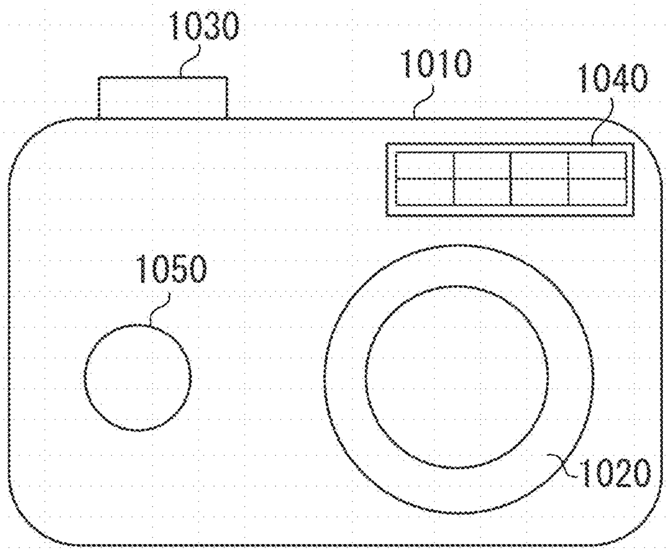
FIGS. 20A and 20B are diagrams each illustrating an external appearance of an imaging apparatus or device according to a fourth exemplary embodiment.
Figure 20B:
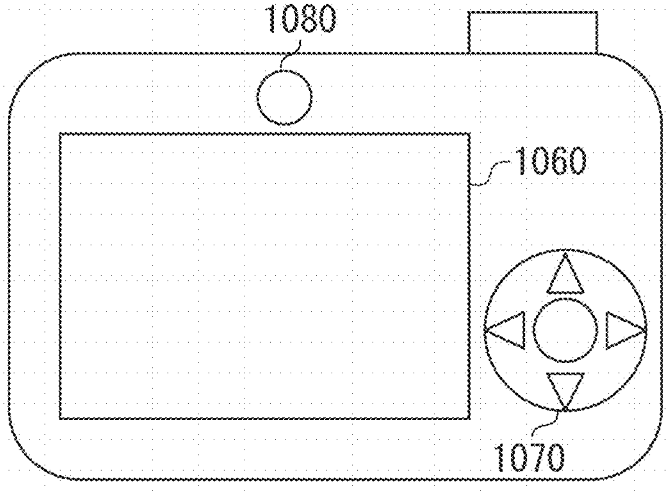

FIGS. 20A and 20B are diagrams illustrating an external appearance of an imaging apparatus 1010 according to the present exemplary embodiment. FIG. 20A illustrates an appearance of a front face of the imaging apparatus 1010, and FIG. 20B illustrates an appearance of a back face of the imaging apparatus 1010. The imaging apparatus 1010 includes an optical unit 1020, an imaging button 1030, an electronic flash 1040, a distance acquisition unit 1050, a display unit 1060, and an operation button 1070.

The optical unit 1020 is a lens barrel including a zoom lens, a focus lens, a shake correction lens, an iris, and a shutter, and collects light information of a subject. The imaging button 1030 is provided for a user to instruct the imaging apparatus 1010 to start image capturing. The electronic flash 1040 is an illuminator capable of emitting light when image capturing starts according to an instruction of the user. The distance acquisition unit 1050 is a distance acquisition module for acquiring range image data of a subject according to an image capturing instruction. The range image data is image data in which, as a pixel value of each pixel of an image, a subject distance corresponding to the pixel is stored. The distance acquisition unit 1050 includes an infrared-light emitting unit that emits an infrared light, and a light receiving unit that receives the infrared light reflected from a subject. The distance acquisition unit 1050 calculates a distance value of a distance from the imaging apparatus 1010 to the subject, based on the time from the emission of the infrared light to the receipt of the infrared light reflected from the subject. The distance acquisition unit 1050 then generates the range image data, by calculating position information of the subject, based on the calculated distance value, and distance imaging information including the number of sensor pixels and an angle of view of the light receiver. The method for acquiring the range image data is not limited to this method. For example, an optical system similar to the optical unit 1020 may be provided in place of the distance acquisition unit 1050, and the range image data may be acquired by performing triangulation based on parallax between two pieces of image data captured from the respective two different viewpoints.

The display unit 1060 is a display such as a liquid crystal display, which displays image data processed in the imaging apparatus 1010 and other various kinds of data. In the present exemplary embodiment, an optical viewfinder is not included in the imaging apparatus 1010 and therefore, framing operation (confirmation of focus and composition) is performed using the display unit 1060. In other words, the user performs image capturing while confirming a live view image on the display unit 1060 and therefore, the display unit 1060 may be said to serve as an electronic viewfinder during the operation for framing and focusing. Besides displaying a live view of an imaging range in real time, the display unit 1060 displays a camera setting menu.

The operation button 1070 is provided for the user to perform an operation of changing an operation mode of the imaging apparatus 1010, and to specify various parameters required during image capturing in the imaging apparatus 1010. In the present exemplary embodiment, a lighting correction processing mode for correcting the degree of illumination in a captured image after image capturing, is included as one of the operation modes. Using the operation button 1070 or the imaging button 1030, the user can, for example, switch to the lighting correction processing mode, set illumination parameters of virtual illumination to be used for lighting correction, and select a subject for which the degree of illumination is to be adjusted. Further, the user can provide an instruction as to whether to output the range image data, when outputting the corrected image data. The display unit 1060 may have a touch screen function, and in such a case, a user instruction using a touch screen can be handled as an input of the operation button 1070.

<Internal Configuration of Imaging Apparatus>

Figure 21:
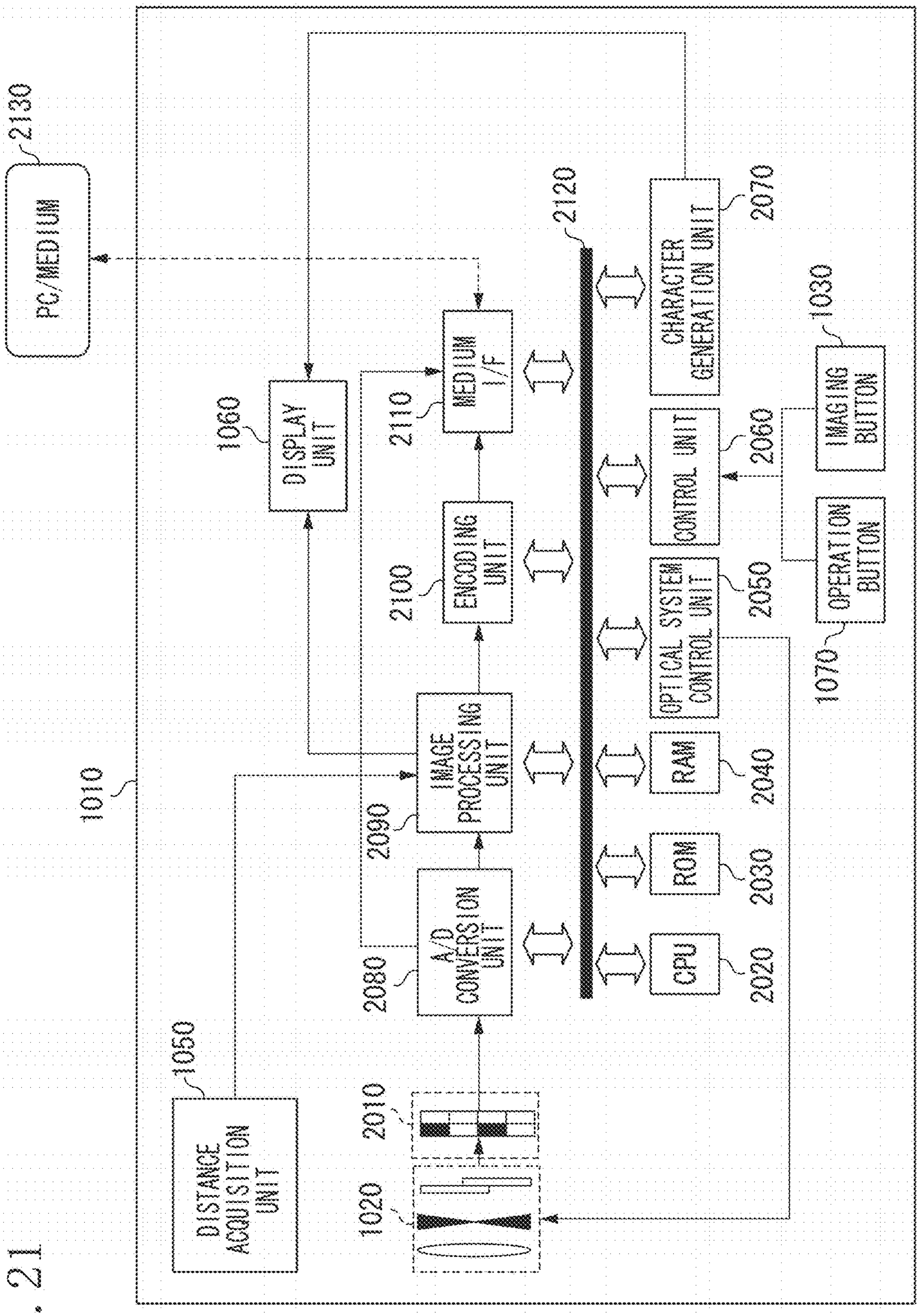
FIG. 21 is a block diagram illustrating an internal configuration of the imaging apparatus device according to the fourth exemplary embodiment.

FIG. 21 is a block diagram illustrating an internal configuration of the imaging apparatus 1010 according to the present exemplary embodiment.

A CPU 2020 is involved in processing of each configuration. The CPU 2020 sequentially reads commands stored in a ROM 2030 and a RAM 2040, and interprets the read commands, and executes processing according to the result of the interpretation. A system bus 2120 is provided for transmission and reception of data. In the present exemplary embodiment, it is assumed that the ROM 2030 stores a face normal model corresponding to a human face. The face normal model includes normal image data in which a normal vector of a face surface, which corresponds to a face having a predetermined shape, is stored in a pixel value. The face normal model also includes organ position information indicating organ positions of parts such as eyes and a mouth of a person in the normal image data.

A control unit 2060 is a control circuit that receives a user instruction from the imaging button 1030 or the operation button 1070, and controls image capturing, switching to the lighting correction processing mode, selecting a subject region, and setting illumination parameters. An optical system control unit 2050 is a control circuit that controls the optical unit 1020 to perform, for example, focusing, opening of the shutter, and adjustment of an aperture, instructed by the CPU 2020.

A color imaging sensor unit 2010 is an imaging sensor that converts light information collected by the optical unit 1020 into a current value. The color imaging sensor unit 2010 includes a color filter having a predetermined array such as a Bayer array, and acquires subject color information from the light collected by the optical unit 1020.

An A/D conversion unit 2080 is a processing circuit that converts the subject color information detected by the color imaging sensor unit 2010 into a digital signal value to have raw image data. In present exemplary embodiment, the range image data and the raw image data that are simultaneously captured can be acquired.

An image processing unit 2090 performs development processing on the raw image data acquired by the A/D conversion unit 2080 to generate color image data. Using the color image data and the range image data, the image processing unit 2090 performs various kinds of image processing, such as generating correction image data by correcting lighting in the color image data. An internal configuration of the image processing unit 2090 will be described in detail below.

A character generation unit 2070 is a processing circuit that generates a character and/or a graphic. The character and/or the graphic generated by the character generation unit 2070 are superimposed on data such as the image data and the correction image data, when displayed on the display unit 1060.

An encoding unit 2100 performs processing for converting various kinds of image data, including the color image data processed by the image processing unit 2090 and the correction image data generated by the lighting correction processing, into a file format such as JPEG.

A medium interface (I/F) 2110 is an interface for transmitting and receiving image data to and from a PC/medium 2130 (e.g., a hard disk, a memory card, a compact flash memory card, and a secure digital card). For example, a universal serial bus (USB) is used for the medium I/F 2110.

<Internal Configuration of Image Processing Unit>

Figure 22:
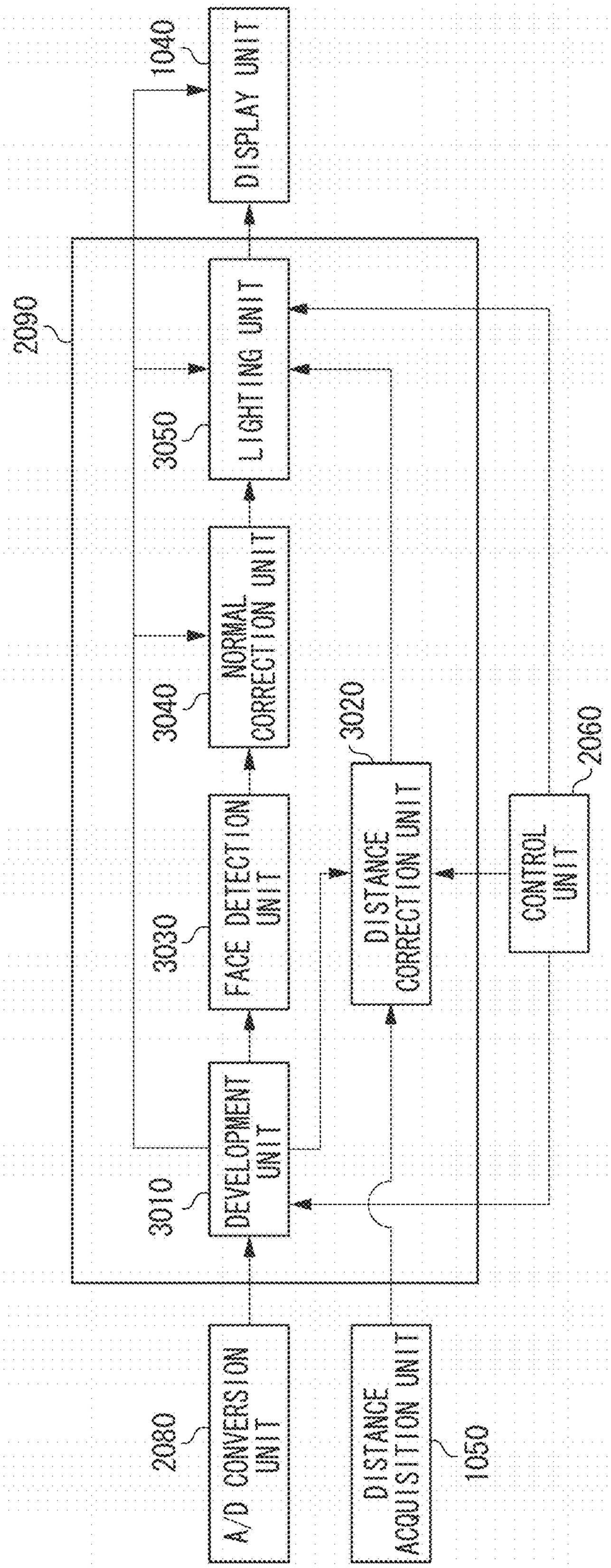
FIG. 22 is a block diagram illustrating a configuration of an image processing unit according to the fourth exemplary embodiment.

FIG. 22 is a block diagram illustrating a functional configuration of the image processing unit 2090 according to the present exemplary embodiment. A development unit 3010 generates color image data, by performing processing, such as white balance processing, demosaic processing, noise reduction processing, color conversion processing, edge enhancement processing, and gamma processing, on the raw image data acquired from the A/D conversion unit 2080. The generated color image data can be output to the display unit 1060 to be displayed thereby, and can be stored into a storage device such as the RAM 2040 and the PC/medium 2130. In the present exemplary embodiment, the development unit 3010 generates the color image data without performing the gamma processing, and outputs the generated color image data to the lighting unit 3050.

A distance correction unit 3020 generates correction distance data corresponding to a subject selected from the range image data, based on color image data, face information, and a subject position selected by the user. In the present exemplary embodiment, it is assumed that the correction distance data stores a distance value mainly corresponding to a person corresponding to the selected subject position, and a distance value corresponding to a background that is a region except for the person.

A face detection unit 3030 acquires face information of the subject from the color image data acquired from the development unit 3010. The face information of the subject at least includes information about a face region indicating a region occupied by the face of the subject in the color image data, and organ positions indicating the positions of parts such as eyes and a mouth included in the face, in the color image data.

A normal correction unit 3040 corrects the face normal model stored in the ROM 2030, based on the face information acquired from the face detection unit 3030 and the color image data acquired from the development unit 3010.

A lighting unit 3050 performs lighting processing on the color image data, based on the correction distance data acquired from the distance correction unit 3020, the correction normal data acquired from the normal correction unit 3040, and the illumination parameters acquired from the control unit 2060. The correction image data generated by the lighting processing can be output to a storage device such as the RAM 2040 and the PC/medium 2130 to be stored therein, and can be output to the display unit 1060 to be displayed thereby.

<Processing Flow of Image Processing Unit>

Figure 23:
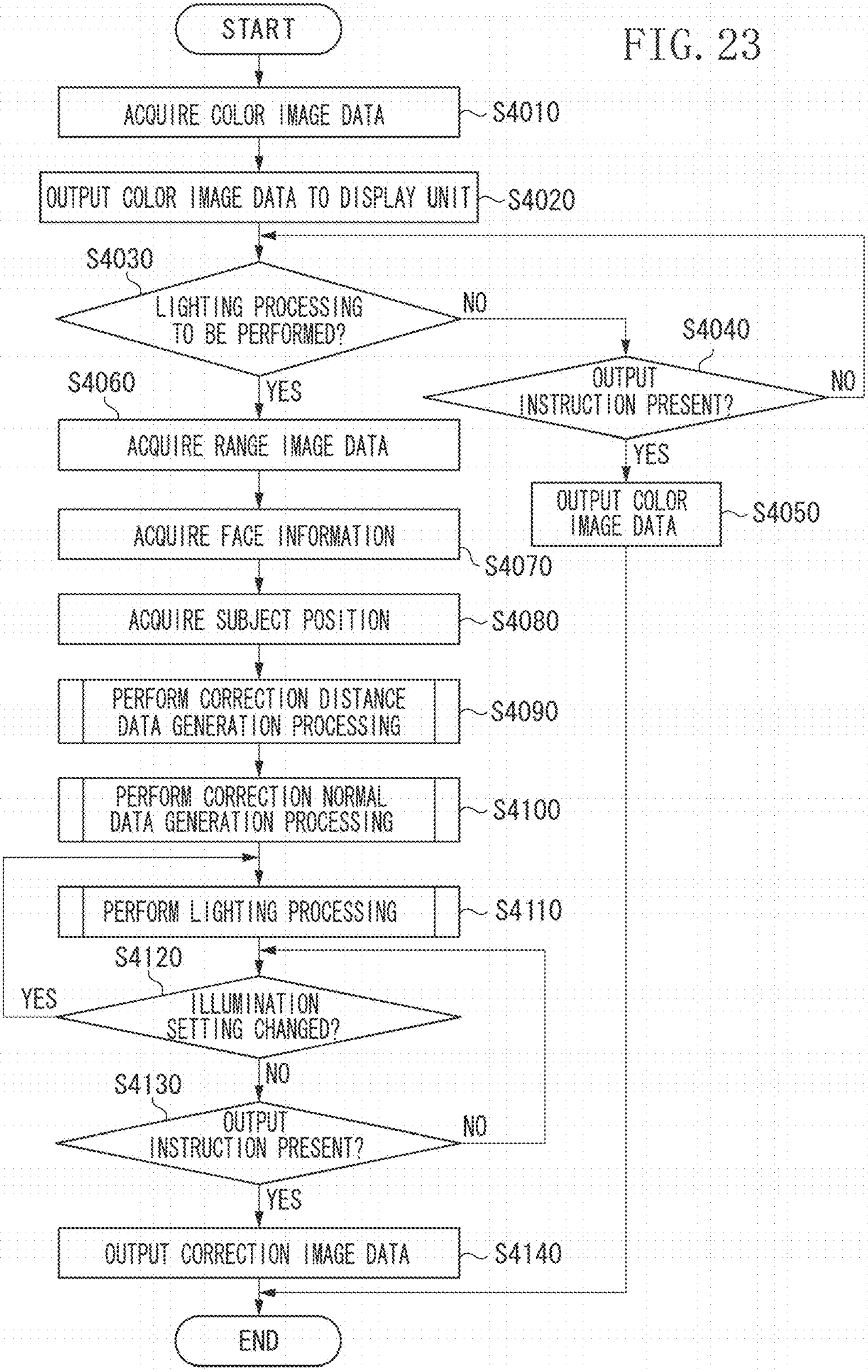
FIG. 23 is a flowchart illustrating a flow of processing according to the fourth exemplary embodiment.

FIG. 23 is a flowchart illustrating an operation procedure of the image processing unit 2090 in the imaging apparatus 1010 of the present exemplary embodiment. In the present exemplary embodiment, the image processing unit 2090 generates the correction distance data corresponding to the selected subject, from the range image data, by using the face information acquired from the color image data, and a subject position P0 acquired based on a user instruction. Next, based on the face information of the subject, and the face normal model held beforehand, normal image data matching with the face of the subject is generated. The correction image data is subsequently generated by performing the lighting processing for adding a virtual light source to the color image data, based on the illumination parameters set by the user operation, and the correction distance data as well as the generated normal image data. Details of the operation procedure of the image processing unit 2090 will be described below.

Figure 24A:
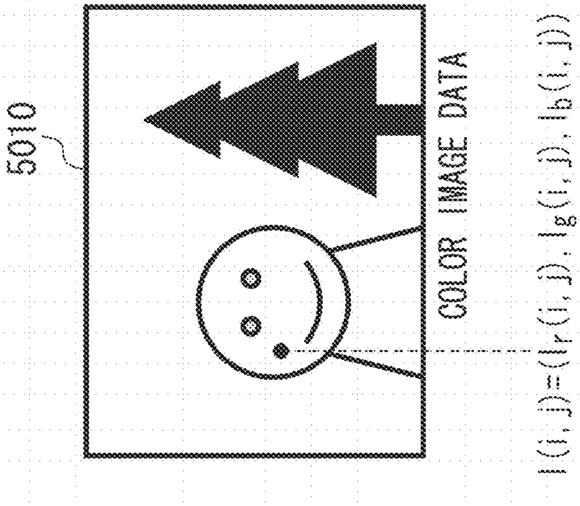
FIGS. 24A and 24B are diagrams each illustrating an example of image data according to the fourth exemplary embodiment.

In step S4010, the color image data is generated by performing the development processing such as the demosaic processing, on the raw image data acquired by the development unit 3010 from the A/D conversion unit 2080. The color image data in the present exemplary embodiment will be described with reference to FIG. 24A. In a pixel (i, j) of color image data 15010, it is assumed that RGB values are stored as a pixel value, and expressed as Ir(i, j), Ig(i, j), and Ib(i, j), respectively. However, the method for acquiring the color image data is not limited to this method. For example, the development unit 3010 may generate color image data, by acquiring raw image data stored in the RAM 2040 or the PC/medium 2130. Alternatively, color image data already subjected to the development processing may be acquired from the RAM 2040 or the PC/medium 2130.

Next, in step S4020, the development unit 3010 outputs the color image data acquired in step S4010, to the display unit 1060. Based on the display on the display unit 1060, the user determines whether to perform the lighting correction processing.

In step S4030, based on an input from the operation unit 1070, the control unit 2060 determines whether an instruction to perform the lighting correction processing is input. When the instruction to perform the lighting correction processing is not input (NO in step S4030), the processing proceeds to step S4040. When an instruction to perform the lighting correction processing is input (YES in step S4030), the control unit 2060 outputs a signal indicating that the lighting correction is to be performed, to the development unit 3010 and the distance correction unit 3020, and then the processing proceeds to step S4060.

In step S4040, the control unit 2060 determines whether an image output instruction is input by the user. When it is determined that an image output instruction is input by the user (YES in step S4040), the processing proceeds to step S4050. When it is determined that an image output instruction is not input by the user (NO in step S4040), the processing returns to step S4030.

In step S4050, the control unit 2060 outputs the image output instruction to the development unit 3010, and then, the development unit 3010 outputs the color image data to the PC/medium 2130, and then the processing ends.

Figure 24B:
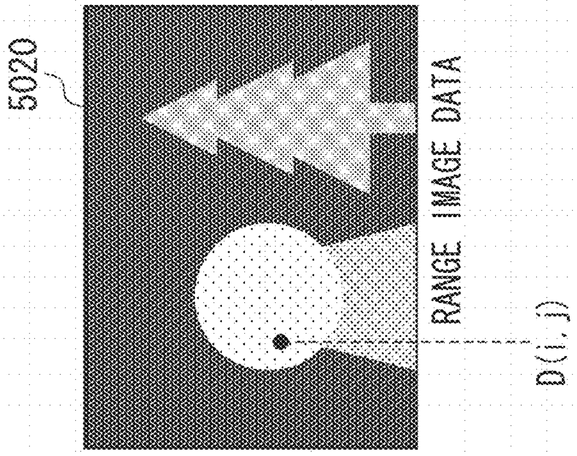

In step S4060, the distance correction unit 3020 acquires the range image data from the distance acquisition unit 1050. The range image data in the present exemplary embodiment will be described with reference to FIG. 24B. It is assumed that a distance value D(i, j) representing a distance from the imaging apparatus 1010 to the subject is be stored as a pixel value, in a pixel (i, j) of range image data D5020. The method for acquiring the range image data is not limited to this method. For example, range image data stored in the RAM 2040 or the PC/medium 2130 may be acquired.

Figure 25:
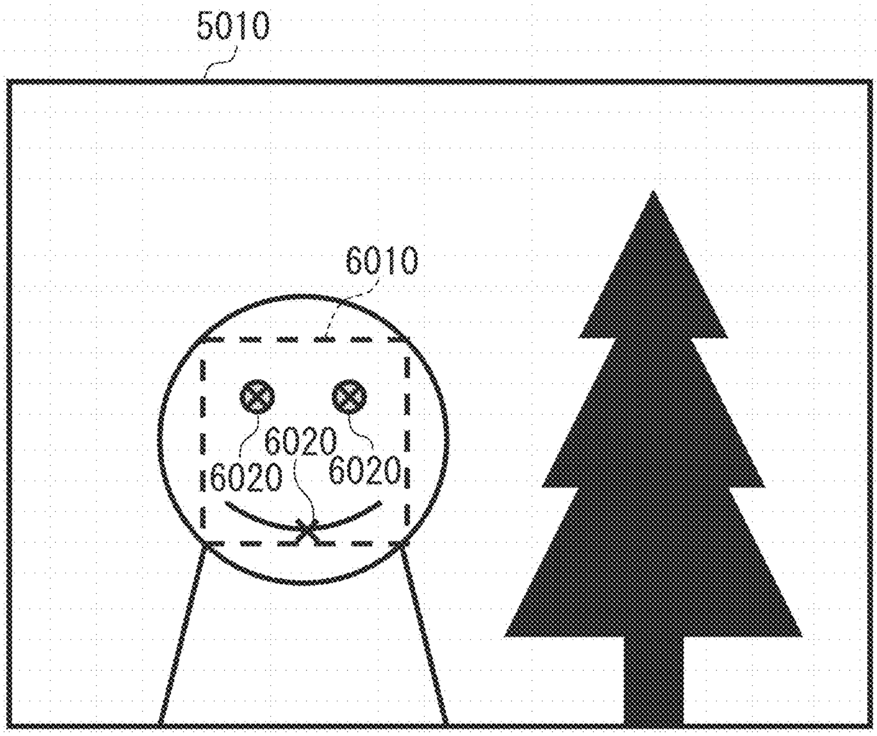
FIG. 25 is a diagram illustrating face information according to the fourth exemplary embodiment.

In step S4070, the development unit 3010 outputs the color image data to the face detection unit 3030, and the face detection unit 3030 acquires the face information of the subject from the input color image data. The face information in the present exemplary embodiment will be described with reference to FIG. 25. The face information in the present exemplary embodiment includes information indicating a face region 6010 and an organ position 6020. The face region represents a set of pixels of a region including the face, in color image data 5010. The organ position 6020 represents coordinates corresponding to each of eyes and a mouth in the face region. An existing algorithm may be used for the method for detecting the face region and the organ position. Examples of the algorithm include an algorithm using template matching and an algorithm using a Haar-like feature amount. In the present exemplary embodiment, the face region and the organ position are detected by the template matching. First, a flesh color region is extracted as a face candidate region, by performing thresholding for the color image data. In other words, pixels, each of which has a pixel value falling in a pixel value range determined based on various flesh colors, are extracted as the face candidate region. Next, matching processing is performed for the face candidate region by using face image templates of various sizes, and calculates a likelihood of the face region. Finally, a region, in which the calculated likelihood is at a predetermined threshold or higher, is extracted as the face region. The face detection unit 3030 also performs similar template matching for the extracted face region, by using image templates of eyes and a mouth, thereby extracting coordinates corresponding to each of the eyes and the mouth. The face region 6010 and the organ position 6020 are acquired by the above-described processing. The face detection unit 3030 outputs the acquired face information, to the normal correction unit 3040. The organ to be detected may be an organ such as a nose and ears, other than eyes and a mouth.

In step S4080, the distance correction unit 3020 determines the position of the subject specified by the user. In the present exemplary embodiment, the user specifies the position of a subject on which the user desires to perform the lighting correction processing, by using a touch panel provided on the display unit 1060, or the operation button 1070. The distance correction unit 3020 acquires, from the control unit 2060, a subject selection position P0' input by a user operation. Next, based on the acquired subject selection position P0', the distance correction unit 3020 calculates a specified subject position P0 in the color image data. In the present exemplary embodiment, the color image data is displayed on the display unit 1060 having the touch screen function, and the display unit 1060 receives an operation of touching the subject on the display screen by the user. The distance correction unit 3020 acquires the position touched by the user from the control unit 2060, as the subject selection position P0'. In this process, the subject selection position P0' corresponds to a pixel position on the display unit 1060. The distance correction unit 3020 calculates the subject position P0, by converting this pixel position on the display unit 1060, into a pixel position in the color image data.

In step S4090, by using the subject position P0 acquired in step S4080, and the color image data acquired from the development unit 3010, the distance correction unit 3020 generates the correction distance data from the range image data acquired in step S4060. The details of the correction distance data generation processing will be described below. The distance correction unit 3020 outputs the generated correction distance data to the lighting unit 3050.

In step S4100, based on the face information acquired from the face detection unit 3030, and the color image data input from the development unit 3010, the normal correction unit 3040 generates the correction normal data that is the normal image data matching with the face of the subject. The details of the correction normal data generation processing will be described below. The normal correction unit 3040 outputs the generated correction normal data to the lighting unit 3050.

In step S4110, based on the input correction distance data and the input correction normal data, the lighting unit 3050 performs the lighting processing such as adding a virtual light source to the color image data, thereby generating the correction image data. Details of the lighting processing will be described below.

In step S4120, the lighting unit 3050 determines whether a change in the setting of the illumination parameters to be used for the lighting processing is input from the control unit 2060. When it is determined that the setting of the illumination parameter is changed (YES in step S4120), the processing returns to step S4110, and the lighting processing is performed again. When it is determined that setting of the illumination parameter is not changed (NO in step S4120), the processing proceeds to step S4130.

In step S4130, the lighting unit 3050 determines whether an image output instruction is input from the control unit 2060. When it is determined that an image output instruction is input (YES in step S4130), the processing proceeds to step S4140. When it is determined that an image output instruction is not input (NO in step S4130), the processing returns to step S4120. In step S4140, the lighting unit 3050 outputs the generated correction image data to the PC/medium 2130, and then the processing ends. The flow of the processing performed in the image processing unit 2090 of the present exemplary embodiment has been described above. According to the above-described processing, the lighting processing can be performed using the face normal model transformed according to the subject. Therefore, it is possible to obtain an image provided with natural shade suitable for the orientation and facial expression of the subject. The processing performed in each part of the image processing unit 2090 will be described in detail below.

<Correction Distance Data Generation Processing>

Figure 26:
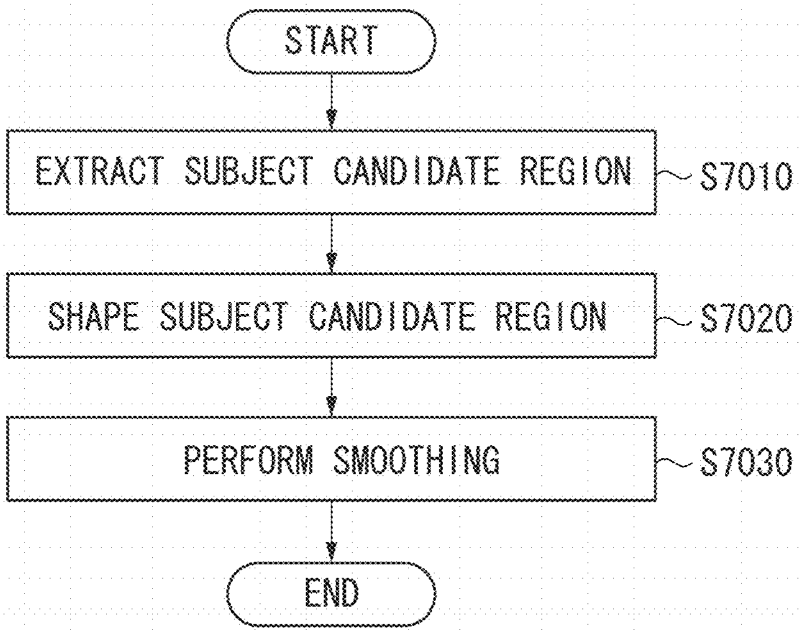
FIG. 26 is a flowchart illustrating a flow of distance correction processing according to the fourth exemplary embodiment.
Figure 27A:
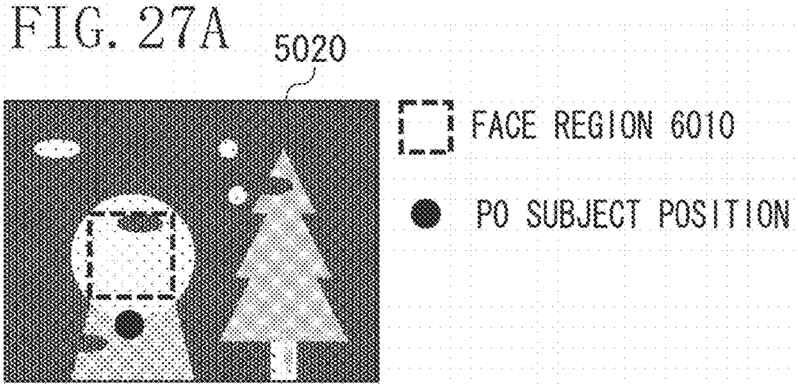
FIGS. 27A, 27B, 27C, and 27D are diagrams illustrating an outline of the distance correction processing according to the fourth exemplary embodiment.
Figure 27B:
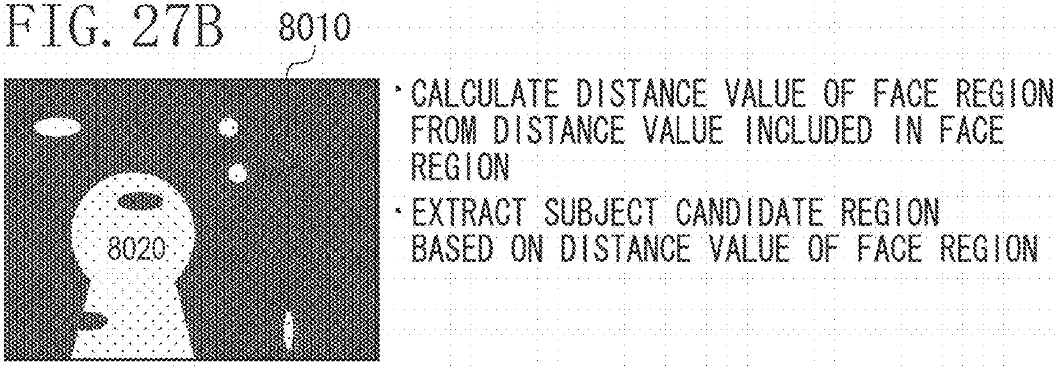

Here, the correction distance data generation processing performed by the distance correction unit 3020 in step S4090 will be described with reference to a flowchart illustrated in FIG. 26. In step S7010, the distance correction unit 3020 extracts the subject candidate region, based on the face information, the subject position P0, and the range image data. The processing in this step will be described with reference to FIGS. 27A and 27B. First, the distance correction unit 3020 selects the face region 6010 closest to the subject position P0, from the face region indicated by the face information. The distance correction unit 3020 then acquires the distance value of each pixel in the selected face region 6010, from the range image data, and calculates an average of the acquired distance values, as a distance value of the face region. Then, the distance correction unit 3020 generates a binary image 8010, in which pixels are divided into pixels, each of which has a distance value that differs from the distance value of the face region 6010 by a predetermined threshold or less, and pixels other than such pixels. In other words, the processing performed here is processing for distinguishing a subject at a distance in a predetermined range of distances from the selected subject, from subjects other than such a subject. Here, in the binary image 8010, it is assumed that the pixels, each of which has the distance value that differs from the distance value of the face region 6010 by the predetermined threshold or less, form a subject candidate region 8020. The determination of the subject candidate region performed here is not limited to the above-described method. A region, in which a distance value differs from the distance value of the selected subject position by a predetermined threshold or less, may be simply determined as the subject candidate region.

Figure 27C:
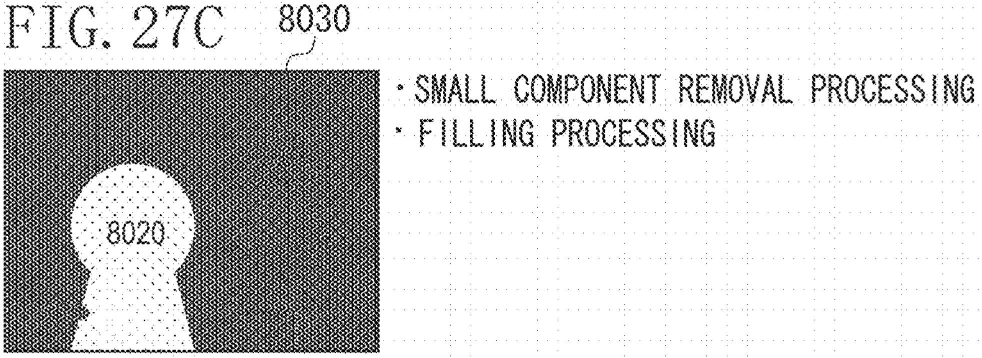

In step S7020, the distance correction unit 3020 performs shaping processing for removing a small connection component included in the subject candidate region 8020 and for filling a hole, by performing small component removal processing and filling processing on the binary image 8010. Methods adoptable as the small component removal processing and the filling processing include a method using a morphological operation and a method using labeling processing. In the present exemplary embodiment, the method using the morphological operation is employed. The distance correction unit 3020 performs opening processing on the subject candidate region 8020 included in the binary image 8010, as the small component removal processing. The distance correction unit 3020 then performs closing processing on the subject candidate region 8020, as the filling processing. FIG. 27C illustrates an example of a binary image 8030 obtained in this step.

Figure 27D:
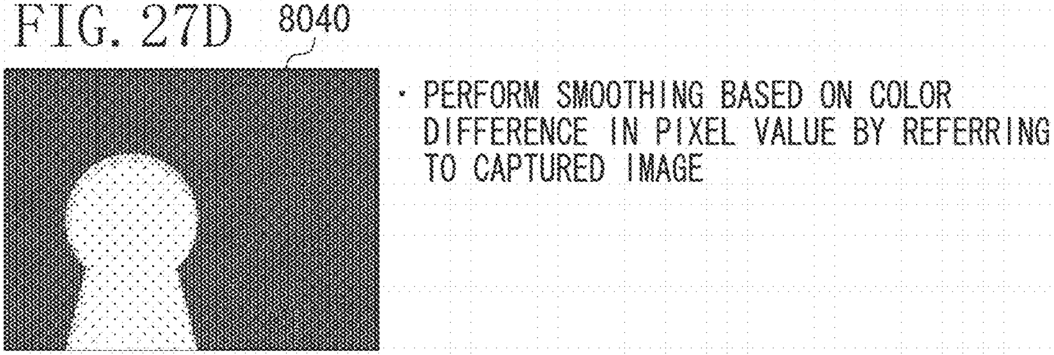

In step S7030, the distance correction unit 3020 performs smoothing processing on the binary image 8030 subjected to the shaping processing in step S7020, thereby generating correction distance data 8040 (FIG. 27D) that is multivalue data. For example, it is assumed that the smoothing processing is performed on an image, in which the pixel value of each of pixels included in the subject candidate region 8020 is 255, whereas the pixel value of each of other pixels is 0, in the binary image 8030. In this case, the correction distance data 8040 including distance information of 8 bits per pixel is generated. Further, it is assumed, in this process, the larger the pixel value is, the smaller the distance to a subject is.

Filters adoptable for the smoothing processing include a Gaussian filter, and a joint bilateral filter that performs smoothing while referring to pixel values of color image data. In the present exemplary embodiment, it is assumed that a joint bilateral filter expressed by the following expression (1) is used.

$$O_s = \frac{1}{k_s}\sum_{p\in\Omega} f(p, s) * g(R_p, R_s) I_p \tag{1}$$

$$k_s = \sum_{p\in\Omega} f(p-s) * g(R_p - R_s)$$

$$f(p, s) = \exp\left(-\frac{|p-s|}{2\sigma_d^2}\right)$$

$$g(R_p, R_s) = \exp\left(-\frac{Y(R_p, R_s)}{2\sigma_r^2}\right)$$

In the expression (1), s represents a process target pixel, Ω represents a neighboring region of s, p represents a pixel included in Ω, and I represents image data to be smoothed. Further, R represents reference image data, f represents a weight based on a distance between a pixel p and the pixel s, and g represents a weight based on a pixel value. The weight f is set in such a manner that the larger the distance between the pixel p and the pixel s is, the smaller the weight f is. The weight g is set in such a manner that the larger the difference between the pixel p of a reference image and the pixel s is, the smaller the weight g is. In the expression (1), it is assumed that Y expresses a luminance difference in pixel value between the pixel p and the pixel s. In step S7030, the smoothing processing is performed, using the binary image 8030 as I, and the color image data as R. By using the joint bilateral filter for the binary image 8030 while referring to the color image data, the smoothing processing can be performed using only the pixels having the pixel values close to each other in the color image data. Therefore, it is possible to perform the smoothing, while matching the outline of the subject candidate region 8020, with the outline of the subject in the color image data. The method for the smoothing processing is not limited to this method. For example, as a method for setting the weight f, equal weights within a neighboring region may be assigned. Further, as a method for setting the weight g, a weight based on a color difference in place of the luminance difference may be assigned. Alternatively, for example, a constant weight, if a pixel value is a constant value or less, may be assigned.

In addition, by acquiring the correction distance data 8040 as a multivalue image, strangeness of the subject outline region can be reduced in the lighting processing performed in step S4090. By performing the above-described processing, the distance correction unit 3020 can acquire the correction distance data 8040, in which mainly a frontward subject and a background are separated and the distance values corresponding to the respective regions are stored. The filtering processing performed here is not necessarily the processing using the joint bilateral filter, and any type of filtering processing may be employed if the filtering processing is based on the pixel value of the color image data.

<Correction Normal Data Generation Processing>

Figure 28:
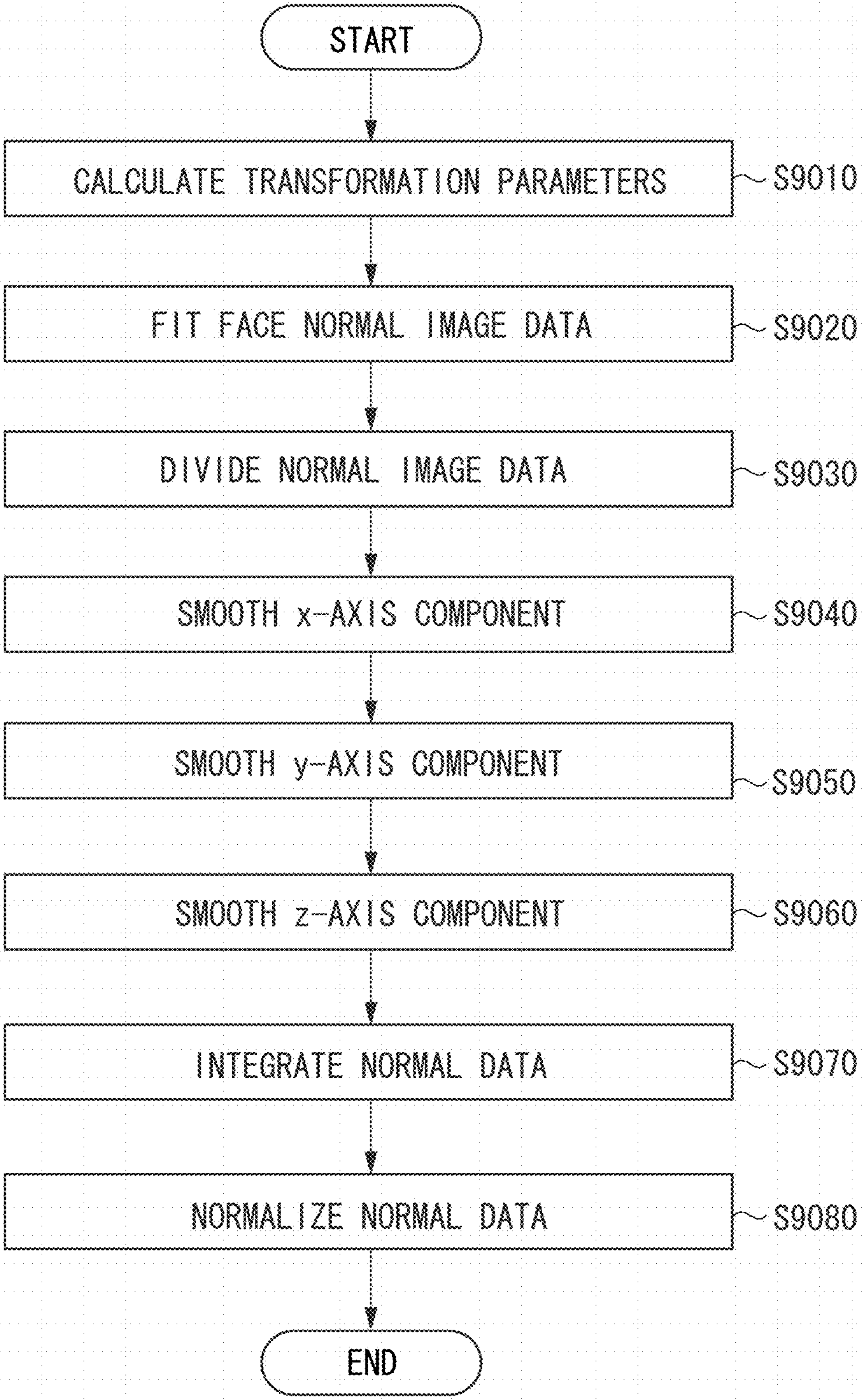
FIG. 28 is a flowchart illustrating a flow of normal correction processing according to the fourth exemplary embodiment.

Here, the correction normal data generation processing performed in the normal correction unit 3040 in step S4100 will be described. The correction normal data generation processing in the present exemplary embodiment is processing for correcting the face normal model stored in the ROM 2030 and the PC/medium 2130, based on the color image data. Details of the correction normal data generation processing will be described below with reference to a flowchart illustrated in FIG. 28.

Figure 29A:
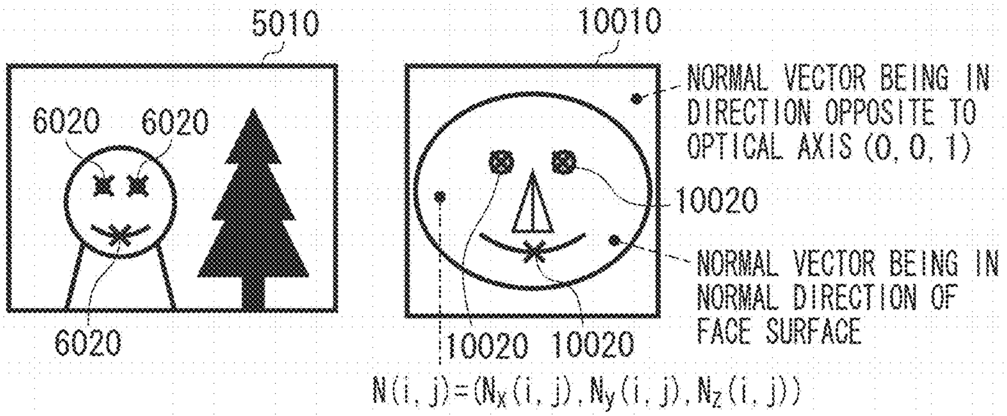
FIGS. 29A and 29B are diagrams illustrating an outline of the normal correction processing according to the fourth exemplary embodiment.

In step S9010, transformation parameters used in transforming the face normal model according to the color image data are calculated. FIG. 29A illustrates an example of the face normal information according to the present exemplary embodiment. The face normal model includes face normal image data 10010, and organ position information 10020 corresponding to the face normal image data 10010. The face normal image data 10010 is image data in which a normal vector (Nx(i, j), Ny(i, j), Nz(i, j)) of the direction of the face is stored as a pixel value in a pixel N(i, j). Of the normal vector stored in the pixel (i, j), Nx(i, j), Ny(i, j), and Nz(i, j) represent a component of an x-axis direction, a component of a y-axis direction, and a component of a z-axis direction, respectively. The x-axis, the y-axis, and the z-axis are orthogonal to each other. Further, it is assumed that all the normal vectors included in the face normal image data 10010 are a unit vector. In a pixel corresponding to the region of the face, it is assumed that a vector in a direction perpendicular to a face surface is stored as the normal vector. In a pixel corresponding to the region except for the face, it is assumed that a vector in a direction opposite to an optical axis of the imaging apparatus 1010 is stored as the normal vector. In the present exemplary embodiment, it is assumed that the z-axis is opposite to the optical axis of the imaging apparatus 1010, and (0,0,1) is stored in the pixel corresponding to the region except for the face, as the normal vector. The organ position information 10020 indicates a coordinate value of each of a right eye, a left eye, and a mouth in the face normal image data 10010.

In this step, based on the organ position information 10020 corresponding to the face normal model, and the organ position 6020 included in the face information of the color image data, the normal correction unit 3040 associates the coordinates of each of the right eye, the left eye, and the mouth in the color image data 5010, with those in the face normal image data 10010. The normal correction unit 3040 then calculates the transformation parameters for matching the organ position information 10020 of the face normal image data 10010 with the organ position 6020. As the transformation parameters, affine transformation coefficients to be used for affine transformation are calculated. A method such as a least squares method can be used as a method for calculating the affine transformation coefficients. In other words, the affine transformation coefficients, which minimize a sum of squares of errors with respect to the organ position 6020 when the affine transformation is performed on the organ position information 10020, are determined as the transformation parameters at this time. In the present exemplary embodiment, the face normal image data 10010 has the components of the x-axis, y-axis, and z-axis directions of the normal vector, as the pixel value. However, these may be assigned to, for example, the respective channels of 3-channel 8-bit color image data. For example, the component of each axis direction of the normal vector takes a value from −1.0 to 1.0, and therefore, information of the normal vector can be held as the 3-channel 8-bit color image data, by assigning a value in this range to 0 to 255.

Figure 29B:
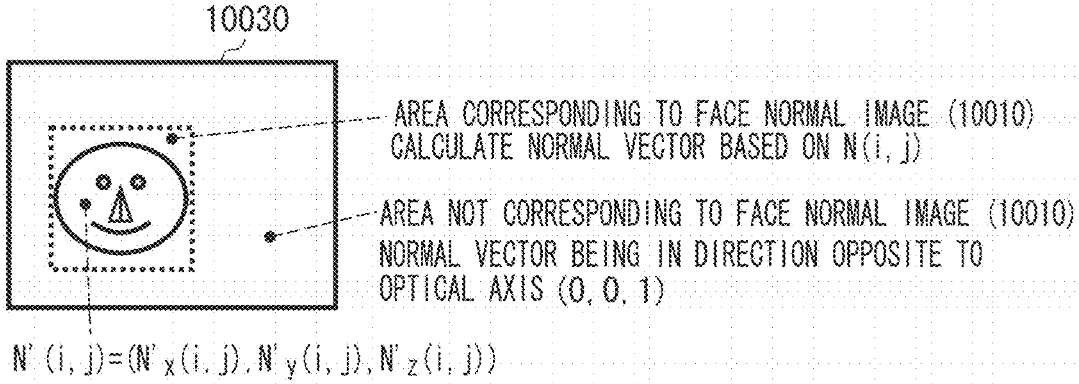

In step S9020, the normal correction unit 3040 generates the normal image data 10030, by converting the face normal image data 10010 by using the affine transformation coefficients calculated in step S9010. The normal image data 10030, in which the face normal image data 10010 is fit into the face region included in the color image data 5010, is thereby generated. The normal image data 10030 is image data in which a normal vector (N'x(i, j), N'y(i, j), N'z(i, j)) is stored as a pixel value in a pixel N'(i, j). For a region corresponding to the face normal image data 10010 (FIG. 29B), the normal vector of the normal image data 10030 is calculated based on a normal vector (Nx, Ny, Nz) stored in each pixel of the face normal image data 10010. For a region not corresponding to the face normal image data 10010, it is assumed that a normal vector (0, 0, 1) in a direction opposite to the optical axis of the imaging apparatus 1010 is stored. By this step, the face region in the face normal image data 10010 can be approximately matched with the face region in the color image data. However, positions other than the organ positions, such as the outline of the face, may not be precisely matched, and therefore, this is corrected in subsequent steps.

Figure 30A:
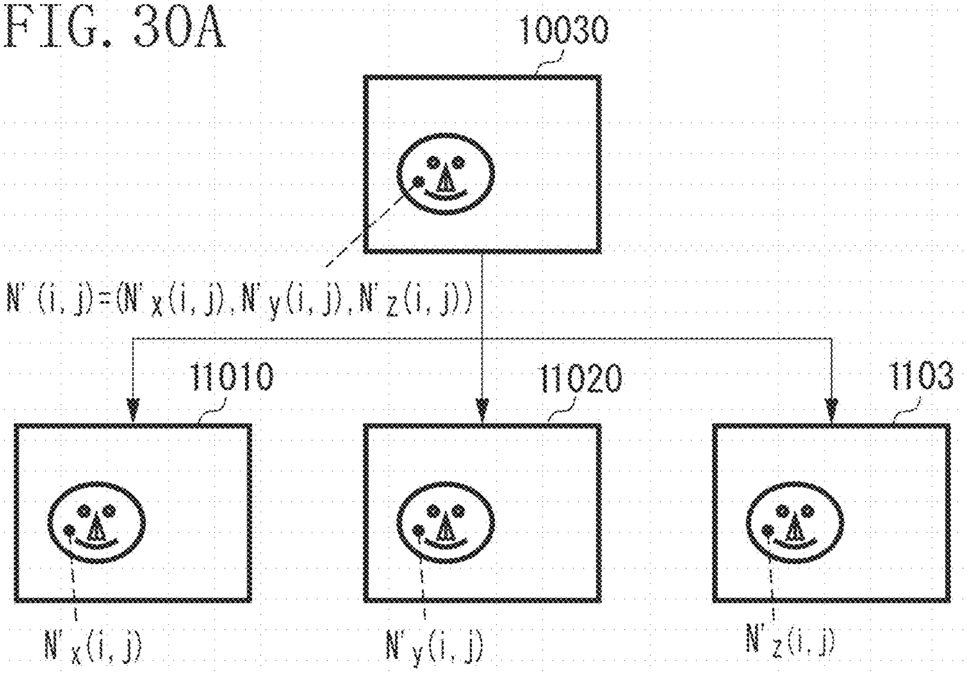
FIGS. 30A and 30B are diagrams each illustrating an outline of the normal smoothing processing according to the fourth exemplary embodiment.

In step S9030, the normal correction unit 3040 divides the normal image data 10030 into the components of the x-axis, y-axis, and z-axis directions, to have three kinds of image data, which are x-axis component normal data 11010, y-axis component normal data 11020, and z-axis component normal data 11030 (FIG. 30A). Smoothing processing similar to that for the binary image 8030 can be thereby applied. In the present exemplary embodiment, the normal correction unit 3040 causes a joint bilateral filter to act in a manner similar to step S7030.

In step S9040, the normal correction unit 3040 generates smoothed x-axis component normal data 11040, by performing the smoothing processing on the x-axis component normal data 11010. The joint bilateral filter, which uses the color image data 5010 as a reference image, is used for the smoothing processing. In the smoothed x-axis component normal data 11040 obtained by this processing, it is assumed that a value N"x of the smoothed x-axis component is stored in each pixel.

In step S9050, the normal correction unit 3040 generates smoothed y-axis component normal data 11050, by performing the smoothing processing on the y-axis component normal data 11020. The joint bilateral filter, which uses the color image data 5010 as a reference image, is used for the smoothing processing. In the smoothed y-axis component normal data 11050 obtained by this processing, it is assumed that a value N"y of the smoothed y-axis component is stored in each pixel.

In step S9060, the normal correction unit 3040 generates smoothed z-axis component normal data 11060, by performing the smoothing processing on the z-axis component normal data 11030. The joint bilateral filter, which uses the color image data 5010 as a reference image, is used for the smoothing processing. In the smoothed z-axis component normal data 11060 obtained by this processing, it is assumed that a value N"z of the smoothed z-axis component is stored in each pixel.

By the processing in step S9040 to step S9060 described above, the outline of the face in the normal image data 10030 can be matched with the outline of the subject in the color image data.

Figure 30B:
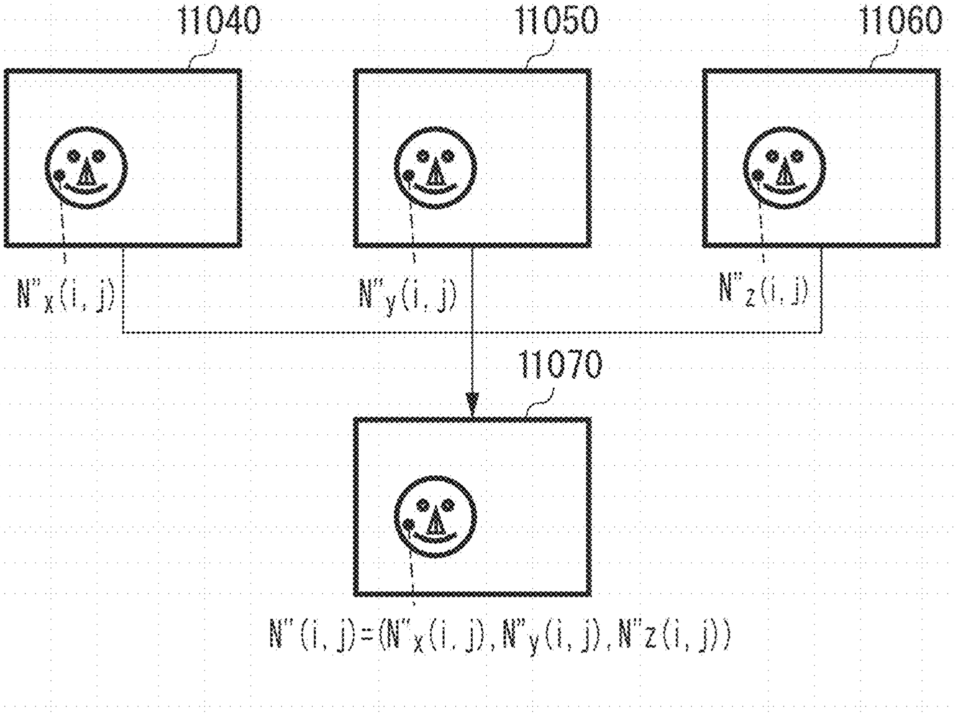

In step S9070, the normal correction unit 3040 generates smoothed normal image data 11070 (FIG. 30B), by integrating the smoothed x-axis component normal data 11040, the smoothed y-axis component normal data 11050, and the smoothed z-axis component normal data 11060. The smoothed normal image data 11070 is image data in which a normal vector (N"x(i, j), N"y(i, j), N"z(i, j)) is stored in a pixel (i, j).

In step S9080, the normal vector stored in each pixel of the smoothed normal image data 11070 is normalized to be the unit vector. In step S9040 to step S9060, the smoothing processing is performed for each axis component, and therefore, the normal vectors stored in the respective pixels vary in magnitude. To correct this variation, the normal vector is normalized to have a magnitude of 1 in this step, as expressed by an expression (2).

$$N_x'''(i,j)=\frac{N_x''(i,j)}{\sqrt{\{N_x''(i,j)\}^2+\{N_y''(i,j)\}^2+\{N_z''(i,j)\}^2}} \quad (2)$$

$$N_y'''(i,j)=\frac{N_y''(i,j)}{\sqrt{\{N_x''(i,j)\}^2+\{N_y''(i,j)\}^2+\{N_z''(i,j)\}^2}}$$

$$N_z'''(i,j)=\frac{N_z''(i,j)}{\sqrt{\{N_x''(i,j)\}^2+\{N_y''(i,j)\}^2+\{N_z''(i,j)\}^2}}$$

Therefore, the correction normal data, in which a normal vector (N'''x(i, j), N'''y(i, j), N'''z(i, j)) having a magnitude of 1 is stored in a pixel (i, j), is acquired.

The normal correction unit 3040 thus acquires the correction normal data. According to the above-described processing, the face normal model can be corrected to match with the face of the subject. Therefore, natural shade can be added to the face of the subject in the lighting processing. In addition, a great change in the normal direction due to the smoothing processing can be prevented, by independently performing the smoothing processing for each coordinate axis component as described above.

<Lighting Processing>

Figure 31:
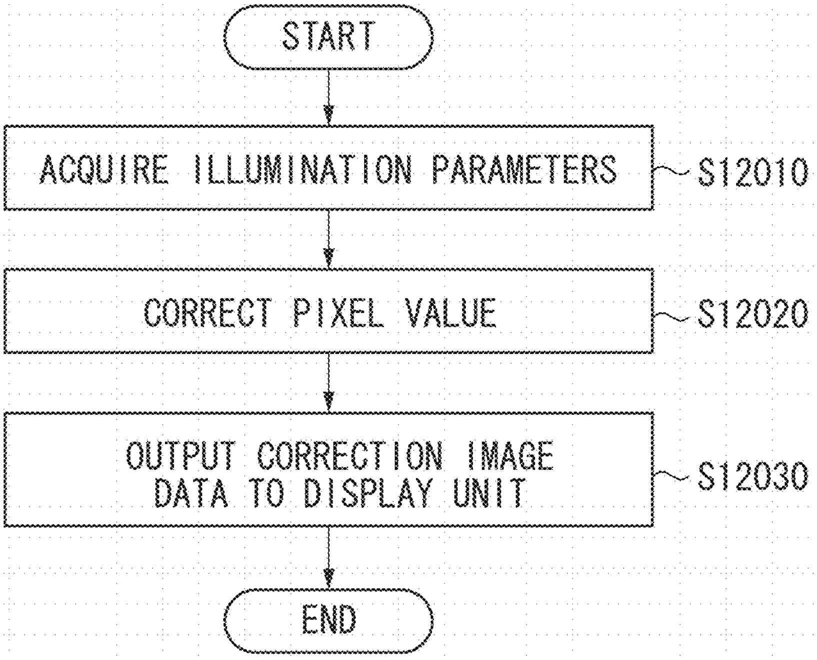
FIG. 31 is a flowchart illustrating a flow of lighting processing according to the fourth exemplary embodiment.

Here, the lighting processing performed in step S4110 will be described. The lighting processing in the present exemplary embodiment is processing for generating a correction image, by performing the processing of adding the virtual light source to the color image data according to the illumination parameters set by the user operation, based on the correction distance data and the correction normal data. Details of the lighting processing will be described below with reference to a flowchart illustrated in FIG. 31.

In step S12010, the lighting unit 3050 acquires the illumination parameters to be used for the lighting processing, which are set by the user from the control unit 2060. In the present exemplary embodiment, the user sets a position Q, an orientation U, brightness α, and a light-source color L of virtual illumination, as the illumination parameters, by operating the operation unit 1070.

In step S12020, the lighting unit 3050 corrects the pixel value of the color image data 5010, based on the correction distance data 8040, the normal image data 1003, and the illumination parameters acquired in step S11010. In the present exemplary embodiment, it is assumed that correction image data I' is generated by correcting the pixel value of the color image data according to an expression (3).

$$I_r'(i,j)=I_r(i,j)+\sum_m k_m(i,j)L_{r,m}I_r(i,j) \quad (3)$$

$$I_g'(i,j)=I_g(i,j)+\sum_m k_m(i,j)L_{g,m}I_r(i,j)$$

$$I_b'(i,j)=I_b(i,j)+\sum_m k_m(i,j)L_{b,m}I_r(i,j)$$

Here, I'r, I'g, and I'b represent the pixel value of the correction image data I', Lrm, Lgm, and Lbm represent the color of mth illumination, and km represents a correction degree for the pixel value with respect to the mth illumination. The correction degree km is determined based on the brightness α, the position Q, the orientation U, and a distance value as well as a normal vector V corresponding to the pixel (x, y), of the illumination. For example, km can be determined by an expression (4).

$$k(i,j)=t\alpha K(\rho)\frac{-V(i,j)\cdot N(i,j)}{W(P(i,j),Q)} \quad (4)$$

Figure 32:
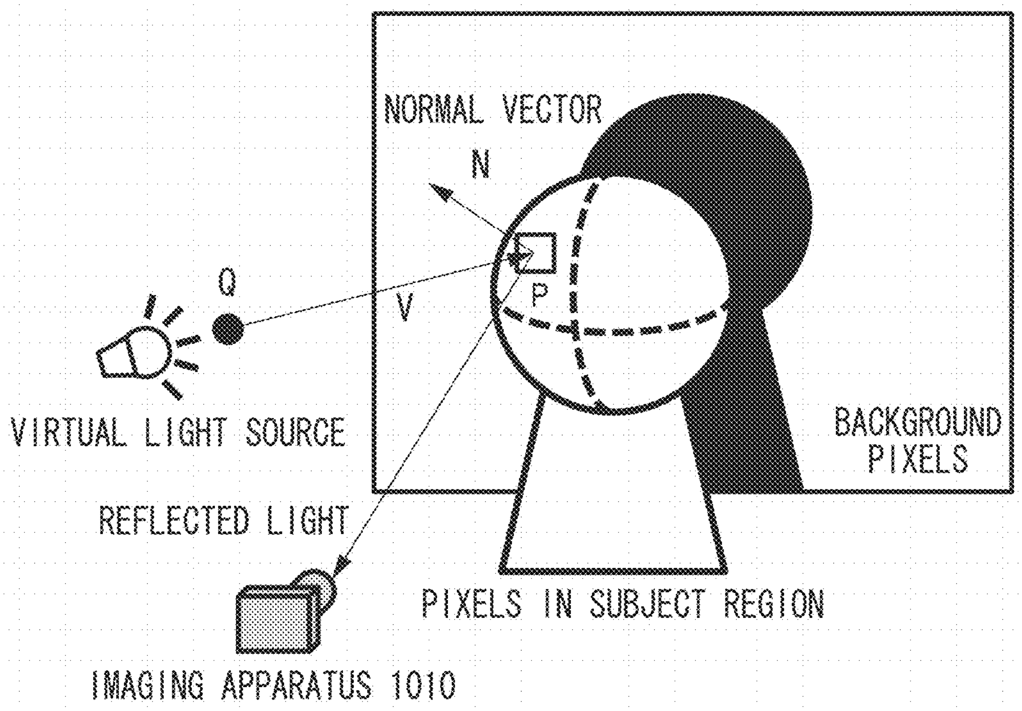
FIG. 32 is a diagram illustrating an outline of the lighting processing according to the fourth exemplary embodiment.
Figure 33:
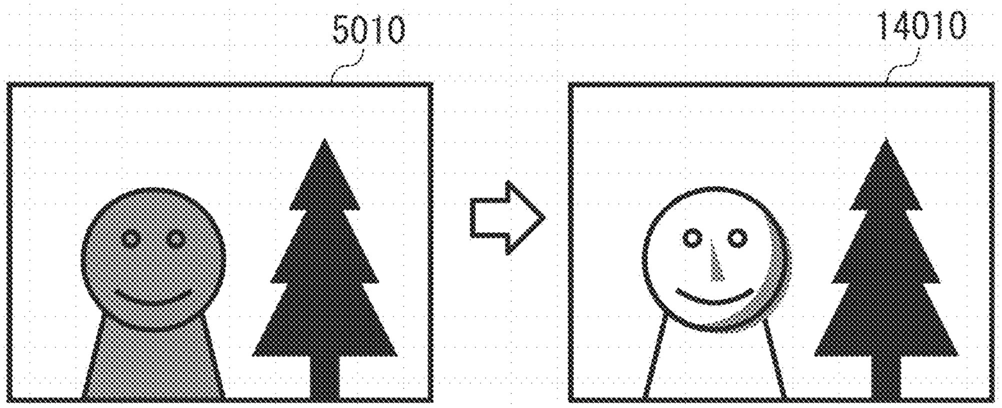
FIG. 33 is a diagram illustrating an effect of the lighting processing according to the fourth exemplary embodiment.

The expression (4) will be described with reference to FIG. 32. In the expression (4), t is a correction coefficient for adjusting the correction degree based on the virtual light source. In the present exemplary embodiment, it is assumed that the correction coefficient t is 1. In the expression (4), a is a variable representing the brightness of the illumination. Q is a vector representing the position of the light source. P is a vector representing a three-dimensional position of the pixel (i, j), and calculated from the correction distance data 8040 as follows. First, based on the pixel value of the correction distance data 8040, a virtual distance value of a distance from the imaging apparatus 1010 to a subject position, corresponding to each pixel, is calculated. It is assumed that, in this process, the larger the pixel value of a pixel in the correction distance data 8040 is, the smaller the distance from the imaging apparatus 1010 to the pixel is. Next, the lighting unit 3050 calculates a three-dimensional position P of the pixel (i, j), based on the virtual distance value corresponding to each pixel, and an angle of view of the imaging apparatus 1010 as well as an image size of the color image data 5010. W is a function that returns a larger value as the distance from the position P of the pixel (i, j) to the position Q of the light source increases. Further, p represents an angle formed by a vector directed from Q toward P(i, j), and the orientation U of the illumination. K is a function that returns a larger value as the angle ρ decreases. N(i, j) is a normal vector corresponding to the pixel (i, j), and V(i, j) is a unit vector representing a direction from Q toward P(i, j). By generating the correction image as described in the present exemplary embodiment, the brightness can be corrected according to the position of the illumination and the shape of the subject. The lighting processing for performing addition for the pixel value according to the distance from the virtual light source is thus performed. By the above-described processing, a pixel, which is closer to the virtual light source and has a smaller angle formed by the vector directed from the virtual light source toward the pixel (i, j) and the normal vector, can be corrected to become brighter. Therefore, as illustrated in FIG. 33, a correction image 14010, in which the subject appears as if the subject is illuminated by the virtual illumination, can be obtained.

In step S12030, the lighting unit 3050 outputs the correction image data, in which the pixel value is corrected, to the display unit 1060 to display the correction image data, and then the processing ends. Then, the user views the correction image data displayed on the display unit 1060, and inputs an illumination-parameter change instruction or an image output instruction.

According to the above-described processing, the lighting processing can be performed using the face normal model transformed to match with the subject. Therefore, it is possible to obtain an image provided with natural shade suitable for the orientation and facial expression of the subject.

In the present exemplary embodiment, the development unit 3010 serves as an image acquisition unit configured to acquire image data representing an image including a subject. The distance correction unit 3020 serves as a distance acquisition unit configured to acquire distance information, which indicates a distance from an imaging apparatus imaging the subject to the subject, for each pixel of the image data. The distance correction unit 3020 also serves as a correction unit configured to correct the distance information. The face detection unit 3030 serves as a detection unit configured to detect a face in the image represented by the image data. The normal correction unit 3040 serves as a transformation unit configured to transform the face model data based on the face detected by the detection unit, thereby generating correction face data. The normal correction unit 3040 also serves as a normal acquisition unit configured to acquire normal information indicating a normal direction on a surface of the subject for each pixel of the image data, based on the distance information. The lighting unit 3050 serves as a processing unit configured to perform lighting processing for correcting a pixel value of the image data, based on the correction face data, the distance information, and the position of the light source. The ROM 2030 serves as a holding unit configured to hold face model data representing a three-dimensional shape of a predetermined face.

The fourth exemplary embodiment is described using the example in which the pixel value of the color image data is corrected regardless of a luminance value of the subject. In a fifth exemplary embodiment, a method for controlling a correction amount based on a luminance value of a subject will be described. Controlling the correction amount based on the luminance value of the subject can suppress overexposures (i.e., phenomenon in which image detail and clarity is lost by image processing), which occur if a region having a high luminance value is corrected beforehand, and a noise increase that occurs if a dark part is corrected.

The present exemplary embodiment is similar to the fourth exemplary embodiment, in terms of the configuration of the imaging apparatus 1010 and the basic flow of the processing, which therefore will not be described again. The fifth exemplary embodiment is different from the fourth exemplary embodiment in that the correction coefficient t included in the expression (4) is determined based on the luminance value of each pixel, in lighting processing to be performed by the lighting unit 3050.

Figure 34A:
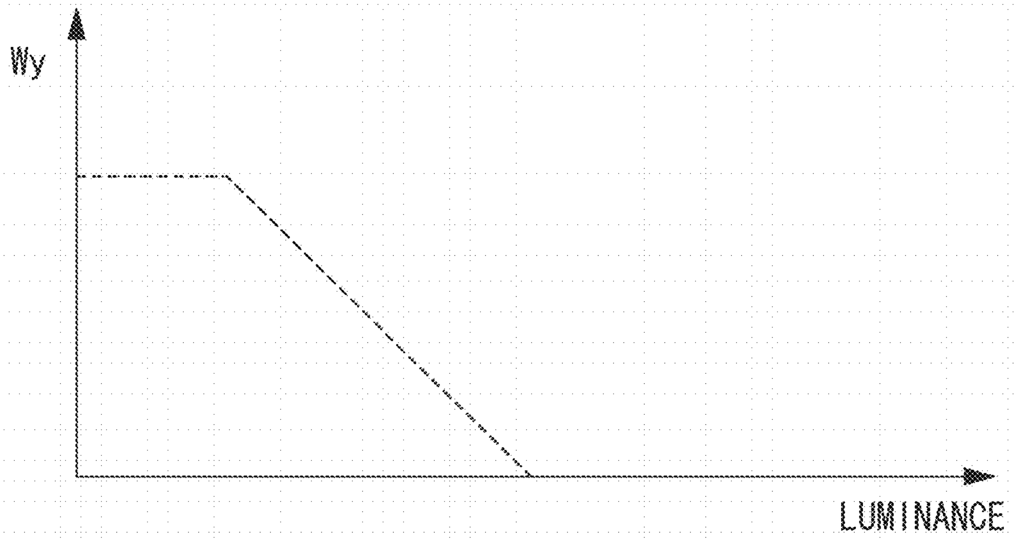
FIGS. 34A and 34B are graphs each illustrating an example of a correction coefficient according to a fifth exemplary embodiment.
Figure 34B:
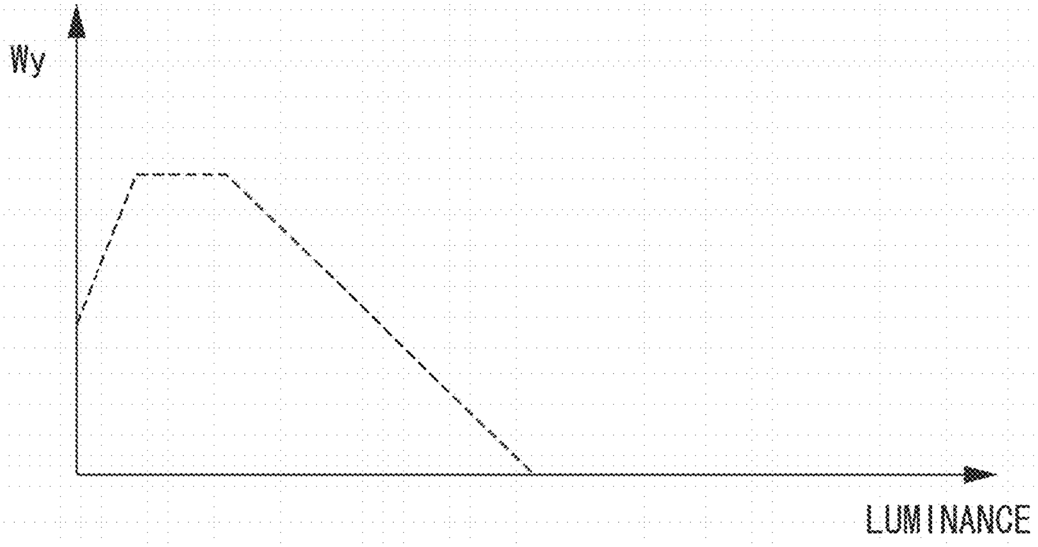

An example of the method for determining the correction coefficient t in the present exemplary embodiment will be described with reference to FIGS. 34A and 34B. FIG. 34A illustrates an example in which the correction coefficient t is determined based on thresholds th1 and th2 that are set beforehand. In this example, the correction coefficient t is determined to be t=1 in a section of 0≤Y<th1, a monotonous decrease of t in a section of th1≤Y<th2, and t=0 in a section of th2≤Y, where Y is a luminance value of a pixel. When the correction coefficient t is thus determined, a pixel with a larger luminance value can have a smaller correction degree based on a virtual light source. Therefore, it is possible to obtain an effect of suppressing overexposures of a pixel with a high luminance value due to an influence of the virtual light source. In FIG. 34A, the correction coefficient t is linearly decreased to be a linear function of Y in the section of th1≤Y<th2. However, the way of decreasing the correction coefficient t is not limited to this example. When it is assumed that the correction coefficient t is the linear function of Y, a correction image I' is expressed as a quadratic function of a pixel value of color image data I. In this case, a pixel value of the correction image may be maximized in the section of th1≤Y<th2, and a tone reversal may therefore occur. To suppress this situation, the decrease in the section of th1≤Y<th2 may be expressed, for example, by a quadratic curve or a trigonometric function. This can suppress the occurrence of the tone reversal in the correction image. Alternatively, the correction coefficient t can be determined as illustrated in FIG. 34B. FIG. 34B illustrates an example in which the correction coefficient t is determined based on thresholds th1, th2, and th3 set beforehand. In this example, the correction coefficient t is determined to achieve a monotonous increase of t in a section of 0≤Y<th3, t=1 in a section of th3≤Y<th1, a monotonous decrease of t in a section of th1≤Y<th2, and t=0 in a section of th2≤Y, where Y is a luminance value. Setting the correction coefficient t as illustrated in FIG. 34B can suppress, in addition to overexposures, emphasis of noise of a dark part with a small luminance value due to the lighting processing. The increase in the section of 0≤Y<th3, or the decrease in the section of th1≤Y<th2 may be expressed by a quadratic curve or a trigonometric function. In this case, occurrence of a tone reversal can be suppressed as in the case illustrated in FIG. 34A.

As described above, according to the processing in the present exemplary embodiment, it is possible to suppress overexposures, which occur if a region having a high luminance value is corrected beforehand, and a noise increase that occurs if a dark part is corrected.

The fourth exemplary embodiment and the fifth exemplary embodiment are each described using the example in which the lighting processing is performed to brighten a subject appearing dark, by adding the virtual light source to the scene. In a sixth exemplary embodiment, there will be described a method for emphasizing a three-dimensional effect of a subject, by adding shade to a subject that appears flat due to an influence of an electronic flash.

The present exemplary embodiment is similar to the fourth exemplary embodiment, in terms of the configuration of the imaging apparatus 1010 and the basic flow of the processing, which therefore will not be described again. The sixth exemplary embodiment is different from the fourth exemplary embodiment, in terms of the processing for correcting the pixel value performed in step S12020. The processing to be performed in step S12020 of the present exemplary embodiment will be described below. In step S12020 of the present exemplary embodiment, the pixel value is corrected based on the following expression (5), unlike the fourth exemplary embodiment.

$$I'_r(i,j) = I_r(i,j) - \sum_m k'_m(i,j) L_{r,m} I_r(i,j) \tag{5}$$

$$I'_g(i,j) = I_g(i,j) - \sum_m k'_m(i,j) L_{g,m} I_r(i,j)$$

$$I'_b(i,j) = I_b(i,j) - \sum_m k'_m(i,j) L_{b,m} I_r(i,j)$$

The expression (5) is difference from the expression (3) in that the pixel value is corrected so as to decrease the pixel value of the color image data according to a correction degree k'm. In other words, the processing performed in the present exemplary embodiment is lighting processing for performing subtraction for the pixel value according to a distance from a virtual light source. The correction degree k'm is determined based on brightness α, a position Q, and an orientation U of illumination, as well as a distance value and a normal vector V corresponding to a pixel (x, y). For example, the correction degree k'm is determined by an expression (6).

$$k'(i, j) = t\alpha K(\rho)\frac{1 + V(i, j)\cdot N(i, j)}{W(P(i, j), Q)} \quad (6)$$

Figure 35:
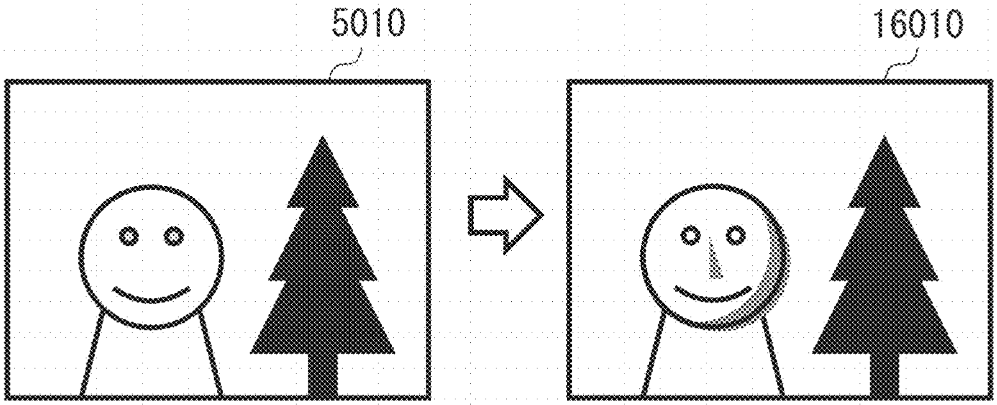
FIG. 35 is a diagram illustrating an effect of lighting processing according to a sixth exemplary embodiment.

The expression (6) is different from the expression (4), mainly in that there is an influence of an angle formed by normal vectors N(i, j) and V(i, j). In the expression (4), the more directly the normal vector N faces the virtual light source, the larger the value of k is. In contrast, in the expression (6), the more directly the normal vector N faces the virtual light source, the smaller the value of k is. In other words, the expression (6) can add stronger shade to a pixel, which is closer to virtual illumination and has the normal vector N less directly facing the virtual light source. Therefore, as represented by a correction image 16010 illustrated in FIG. 35, shade can be added only to a cheek and a nose of a face based on the normal image data.

According to the above-described processing, it is possible to perform the correction for adding shade for producing a three-dimensional effect, to a subject that appears flat due to an influence of an electronic-flash emission.

Figure 36:
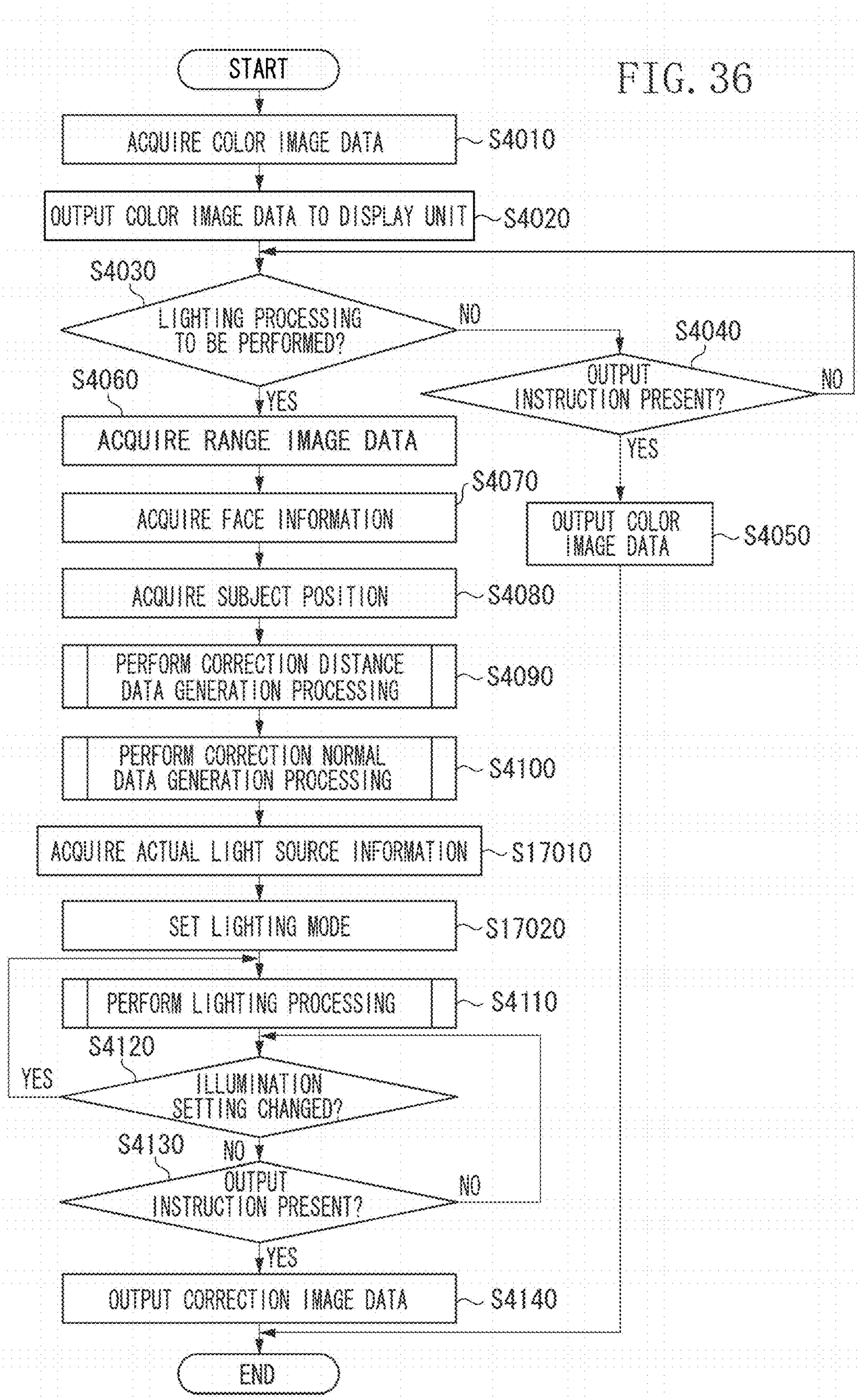
FIG. 36 is a flowchart illustrating a flow of processing according to a seventh exemplary embodiment.

In the above-described exemplary embodiments, there are described the lighting processing for adding the virtual light source to the scene, and the lighting processing for adding the shade to the image. In a seventh exemplary embodiment, there will be described a method for switching between the above-described two kinds of processing based on image capturing conditions. FIG. 36 is a flowchart illustrating an operation procedure of the image processing unit 2090 in the seventh exemplary embodiment. The seventh exemplary embodiment is different from the fourth exemplary embodiment in that steps S17010 and S17020 are added.

In step S17010, the lighting unit 3050 acquires information about an actual light source. In the present exemplary embodiment, the actual light source is a light source that is actually present in a space where an image of a subject is captured. In the present exemplary embodiment, it is assumed that the control unit 2060 determines the presence or absence of an electronic-flash emission, based on an instruction for using the electronic flash 1040 from the user, or an input signal from the electronic flash 1040. The control unit 2060 then outputs, to the lighting unit 3050, information indicating whether the electronic flash 1040 is used in image capturing for obtaining image data. When it is determined that the electronic flash 1040 is used in image capturing for obtaining image data, information, which indicates light being emitted by the electronic flash 1040 located at a predetermined position Q', is acquired. The method for acquiring the information about the actual light source is not limited to this method. For example, an average luminance of pixels in a face region of a selected subject may be calculated, and occurrence of an electronic-flash emission may be determined when the average luminance is at a threshold or higher.

In step S17020, the lighting unit 3050 sets a mode for the lighting processing, based the actual light source information acquired in step S17010. When the absence of an electronic-flash emission in image capturing is determined in step S17010, a lighting mode corresponding to the lighting for adding the virtual light source described in the fourth exemplary embodiment is set in step S17020. When the presence of an electronic-flash emission in image capturing is determined in step S17010, a lighting mode corresponding to the lighting for adding the shade described in the sixth exemplary embodiment is set in step S17020.

Next, in step S4110, the lighting unit 3050 generates the correction image data, by performing the lighting processing corresponding to the lighting mode set in step S17020, on the color image data.

The flow of the processing according to the present exemplary embodiment has been described above. According to the above-described processing, appropriate lighting processing can be selected according to the state of a light source when an image of a subject is captured.

The processing in the present exemplary embodiment is not limited to the above-described example. For example, the position Q' of the electronic flash light may be acquired as the actual light source information in step S17010, and the position Q' of the electronic flash light may be input as the initial value of the illumination parameter in the lighting processing in step S4110. Alternatively, the lighting mode may be set as follows. First, an actual light source other than the electronic flash is detected in a region where a luminance is larger than a predetermined threshold in the color image data. When the detected actual light source is present at a position closer to the imaging apparatus 1010 than to a subject, the lighting mode for adding the shade is set. The position of an actual light source may be acquired from the color image data, and input as the initial value of the illumination parameter.

Other Exemplary Embodiments

An exemplary embodiment of the disclosure is not limited to the above-described embodiments. For example, the lighting processing may be performed by directly using the distance information of a subject, without using the normal image data. In this case, it is necessary to use a calculation expression different from the above-described expressions and thus, the processing becomes complicated. However, an effect similar to those in the above-described exemplary embodiments of the disclosure can be obtained. In this case, a 3D model of a predetermined face may be held in place of the face normal model. In other words, information indicating a three-dimensional shape of a subject may be widely used in an exemplary embodiment of the disclosure. Further, a 3D model of a predetermined face may be held in place of the face normal model, and the normal information may be acquired based on the 3D model after transforming the 3D model.

The above-described exemplary embodiments can reduce strangeness of an image or render the image normal when image lighting correction is performed using three-dimensional shape data.

Other Embodiments

Embodiment(s) of the disclosure can also be realized by a computer of a system or apparatus that reads out and executes computer executable instructions (e.g., one or more programs) recorded on a storage medium (which may also be referred to more fully as a ‘non-transitory computer-readable storage medium’) to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-083724, filed Apr. 15, 2015, and No. 2015-102819, filed May 20, 2015, which are hereby incorporated by reference herein in their entirety.

What is claimed is:

1. An image processing apparatus comprising:

an image acquisition unit configured to acquire image data representing an image including a subject;

a setting unit configured to set a position of a virtual light source;

a holding unit configured to hold face model data representing a three-dimensional shape of a predetermined face;

a detection unit configured to detect face information including information indicating a face region occupied by the face of the subject in the image represented by the image data;

a generation unit configured to generate correction face data that is normal data according to the face of the subject based on the face information detected by the detection unit and the face model data; and a processing unit configured to perform lighting processing for correcting pixel values of pixels in the face region, based on the correction face data and the position of the virtual light source.

2. The image processing apparatus according to claim 1, further comprising a distance acquisition unit configured to acquire distance information, which indicates a distance from an imaging device that has captured the image of the subject to the subject, for each pixel of the image data; and a normal acquisition unit configured to acquire normal information indicating a normal direction on a surface of the subject for each pixel of the image data, based on the distance information, wherein the processing unit performs the lighting processing based on the correction face data, the normal information, and the position of the light source.

3. The image processing apparatus according to claim 2, wherein the face model data is normal image data in which a normal direction of a surface of the predetermined face is stored for each pixel of an image indicating the predetermined face, and wherein the normal acquisition unit corrects, of the normal information, normal information of a region corresponding to the face detected by the detection unit, based on the correction face data, and wherein the processing unit performs the lighting processing, based on the normal information corrected based on the correction face data, and the position of the light source.

4. The image processing apparatus according to claim 1, wherein the face model data has a normal direction of a surface of the predetermined face, as a component in a direction of each of three coordinate axes orthogonal to each other, for each pixel of an image indicating the predetermined face, and wherein the generation unit further causes a joint bilateral filter based on the pixel value of the image data to act on the transformed face model data, for each direction of the coordinate axes.

5. The image processing apparatus according to claim 1, wherein the lighting processing is processing for performing addition or subtraction for the pixel value of the image data according to a distance between a subject position corresponding to each pixel of the image data and the position of the light source set by the setting unit.

6. The image processing apparatus according to claim 1, wherein the processing unit acquires information indicating presence or absence of an electronic-flash emission when the image data is captured, wherein, in a case where the electronic-flash emission is present when the image data is captured, the processing unit performs, as the lighting processing, processing for performing subtraction for the pixel value of the image data according to a distance between a subject position corresponding to each pixel of the image data and the position of the light source set by the setting unit, and wherein, in a case where the electronic-flash emission is absent when the image data is captured, the processing unit performs, as the lighting processing, processing for performing addition for the pixel value of the image data according to the distance between the subject position corresponding to each pixel of the image data and the position of the light source set by the setting unit.

7. The image processing apparatus according to claim 1, wherein the processing unit determines a correction degree for the pixel value of each pixel of the image data, based on a luminance value of each pixel of the image data, and the correction degree for the pixel value is smaller for the pixel of which the luminance value is larger.

8. The image processing apparatus according to claim 1, wherein the generation unit transforms the face model data according to the face region detected by the detection unit.

9. The image processing apparatus according to claim 8, wherein the detection unit detects organ position information indicating positions of parts included in the face as the face information, wherein the generation unit transforms the face model data so that positions of parts in the face indicated by the face model data match the positions of parts included in the face detected by the detection unit.

10. The image processing apparatus according to claim 1, further comprising a distance acquisition unit configured to acquire distance information, which indicates a distance from an imaging device that has captured the image of the subject to the subject, for each pixel of the image data, wherein the processing unit performs lighting processing for correcting pixel values of pixels in the face region based on the distance information, the correction face data and the position of the virtual light source.

11. The image processing apparatus according to claim 10, wherein the distance acquisition unit acquires distance image data that contains a distance value for each pixel from the imaging device, and corrects the distance image data based on the face information detected by the detection unit to acquire the distance information.

12. The image processing apparatus according to claim 1, wherein the face model data includes normal image data in which a normal vector of the surface of the predetermined face, which corresponds to a face having the three-dimensional shape, is stored in a pixel value.

13. An image processing method comprising:

acquiring image data representing an image including a subject;

setting a position of a virtual light source;

holding face model data representing a three-dimensional shape of a predetermined face;

detecting face information including information indicating a face region occupied by the face of the subject in the image represented by the image data;

generating correction face data that is normal data according to the face of the subject based on the detected face and the face model data; and performing lighting processing for correcting pixel values of pixels in the face region based on the correction face data and the position of the virtual light source.

14. A non-transitory computer readable storage medium storing a program for causing a computer to execute an image processing method, the method comprising:

acquiring image data representing an image including a subject;

setting a position of a virtual light source;

holding face model data representing a three-dimensional shape of a predetermined face;

detecting face information including information indicating a face region occupied by the face of the subject in the image represented by the image data;

generating correction face data that is normal data according to the face of the subject based on the detected face and the face model data; and performing lighting processing for correcting pixel values of pixels in the face region based on the correction face data and the position of the virtual light source.

* * * * *